(12) United States Patent
De et al.

(10) Patent No.: US 9,710,571 B2
(45) Date of Patent: Jul. 18, 2017

(54) GRAPHICAL TOP-DOWN PLANNING SYSTEM

(71) Applicant: Oracle International Corporation, Redwood Shores, CA (US)

(72) Inventors: Niladri De, Hyderabad (IN); Surya Vedula, Hyderabad (IN); Mani Kumar Vran Kasibhatla, Hyderabad (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 629 days.

(21) Appl. No.: 14/200,054

(22) Filed: Mar. 7, 2014

(65) Prior Publication Data

US 2015/0254373 A1 Sep. 10, 2015

(51) Int. Cl.
*G06F 7/00* (2006.01)
*G06F 17/00* (2006.01)
*G06F 17/30* (2006.01)
*H04L 12/24* (2006.01)
*G06Q 10/06* (2012.01)

(52) U.S. Cl.
CPC . *G06F 17/30961* (2013.01); *G06Q 10/06313* (2013.01); *H04L 41/145* (2013.01)

(58) Field of Classification Search
USPC .......................................................... 707/798
See application file for complete search history.

(56) References Cited

U.S. PATENT DOCUMENTS 5,737,728 A 4/1998 Sisley et al.
5,745,110 A 4/1998 Ertemalp
(Continued)

FOREIGN PATENT DOCUMENTS

EP 1026609 A2 8/2000
WO 9416397 7/1994
(Continued)

OTHER PUBLICATIONS

Ragnar Bade et al., "Connecting time-oriented data and information to a coherent interactive visualization", Proceedings of the 2004 Conference on Human Factors in Computing Systems, CHI '04, Jan. 1, 2004, pp. 105-112, XP055138586.
Oracle, "Oracle RCUI Guidelines", Oracle ADF Rich Client User Interface Guidelines, Gantt Chart Usage Guideline, http://www.oracle.com/webfolder/ux/middleware/richclient/index.html?/webfolder/ux/middleware/richclient/guidelines5/gantt.html, last downloaded Jan. 15, 2015.
(Continued)

*Primary Examiner* — Muluemebet Gurmu
(74) *Attorney, Agent, or Firm* — Miles & Stockbridge P.C.

(57) ABSTRACT

A system is provided that visually represents a planning structure. The system displays a node that represents an element of the planning structure and a value associated with the element within a user interface. The system further receives a first user interaction that is a movement of a cursor over the node in a direction. The system further generates child elements within the planning structure in response to the first user interaction, where the child elements are children of the element. The system further generates values associated with the child elements, where a combination of the values is equal to the original value. The system further displays child nodes that represent the child elements and the values within the user interface. The system further displays lines between the node and the child nodes, where each line represents a parent-child relationship.

24 Claims, 13 Drawing Sheets

(56) References Cited

U.S. PATENT DOCUMENTS

| | | | |
|---|---|---|---|
| 6,211,856 | B1 | 4/2001 | Choi et al. |
| 6,707,903 | B2 | 3/2004 | Burok et al. |
| 6,920,632 | B2 | 7/2005 | Donovan et al. |
| 7,092,929 | B1 | 8/2006 | Dvorak et al. |
| 7,406,432 | B1 | 7/2008 | Motoyama |
| 7,536,313 | B2 | 5/2009 | Motoyama |
| 7,688,322 | B2 | 3/2010 | Kapler et al. |
| 7,912,746 | B2 | 3/2011 | Kline et al. |
| 7,921,026 | B2 | 4/2011 | O'Cull et al. |
| 8,099,312 | B2 | 1/2012 | Jin et al. |
| 8,160,911 | B2 | 4/2012 | Lau et al. |
| 8,286,103 | B2 | 10/2012 | Chaudhri et al. |
| 8,433,632 | B2 | 4/2013 | Sankaran et al. |
| 8,544,011 | B2 | 9/2013 | Tanikawa |
| 8,776,008 | B2 | 7/2014 | Kapoor et al. |
| 2003/0038831 | A1 | 2/2003 | Engelfriet |
| 2003/0061266 | A1 | 3/2003 | Ouchi |
| 2005/0149370 | A1 | 7/2005 | Brown |
| 2005/0165631 | A1 | 7/2005 | Horvitz |
| 2005/0198103 | A1 | 9/2005 | Ching |
| 2006/0004618 | A1 | 1/2006 | Brixius |
| 2007/0073575 | A1* | 3/2007 | Yomogida ...... G06Q 10/063114 705/7.15 |
| 2007/0150327 | A1 | 6/2007 | Dromgold |
| 2007/0233534 | A1* | 10/2007 | Martin ............ G06Q 10/06 705/301 |
| 2007/0245300 | A1* | 10/2007 | Chan ............... G06Q 10/06 717/105 |
| 2008/0103871 | A1 | 5/2008 | Ruehl et al. |
| 2008/0126114 | A1 | 5/2008 | McClure |
| 2008/0155433 | A1 | 6/2008 | Robertson et al. |
| 2008/0221946 | A1 | 9/2008 | Balon |
| 2009/0133027 | A1 | 5/2009 | Gunning et al. |
| 2009/0198540 | A1 | 8/2009 | Kienzle et al. |
| 2009/0234699 | A1* | 9/2009 | Steinglass ........ G06Q 10/06313 705/7.23 |
| 2010/0010856 | A1 | 1/2010 | Chua et al. |
| 2011/0107256 | A1 | 5/2011 | Robertson et al. |
| 2011/0271220 | A1 | 11/2011 | Remsberg et al. |
| 2011/0283285 | A1 | 11/2011 | Saad et al. |
| 2012/0130907 | A1 | 5/2012 | Thompson et al. |
| 2012/0278118 | A1 | 11/2012 | Araki et al. |
| 2013/0144679 | A1 | 6/2013 | Burnett et al. |
| 2014/0244334 | A1 | 8/2014 | De et al. |

FOREIGN PATENT DOCUMENTS

| | | |
|---|---|---|
| WO | 0118683 A2 | 3/2001 |
| WO | 2004102431 A1 | 11/2004 |
| WO | 2009055425 A1 | 4/2009 |
| WO | 2012092556 A2 | 7/2012 |
| WO | 2013100902 A1 | 7/2013 |
| WO | 2013162572 A1 | 10/2013 |

OTHER PUBLICATIONS

Opinion Center Li, "Microsoft Project", http://opinioncenter.li/microsoft-project/, last downloaded Jan. 15, 2015.

Seavus Project Viewer, "User Manual for Seavus Project Viewer 11", http:www.seavusprojectviewer.com/support/documents/, last visited on Jan. 22, 2015, 118 pages.

Daniel D. Suthers, "An Analysis of Explanation and Its Implications for the Design of Explanation Planners", Computer Science, Feb. 1993, ftp://ftp.pitt.edu/dept/lrdc/edtech/suthers/suthers-thesis-full.pdf, last downloaded Mar. 5, 2014.

Charlotte Russe, "BOARD delivers Budgeting and Planning Applications for Charlotte Russe", http://www.board.com/downloads/1en_CharlotteRusse.pdf, last downloaded Mar. 5, 2014.

Constraints and Dependencies—Gantt Charts Online—Gantto.com, http://gantto.com/support/documentation/constraints-and-dependencies/?overlay=false, last downloaded Mar. 5, 2014.

Stephen Sloan et al., "CPM and Gantt: The Next Step in Multi-Project Management", http://www.nesug.org/Proceedings/nesug12/ma/ma07.pdf, last downloaded Mar. 5, 2014.

Distribute project work evenly (level resource assignments), http://office.microsoft.com/en-in/project-help/distribute-project-work-evenly-level-resource-assignments-HA001231647.aspx, last downloaded Mar. 5, 2014.

Agata Czarnigowska, "Earned value method as a tool for project control", Budownictwo i Architektura 3 (2008) 15-32, http://yadda.icm.edu.pl/baztech/element/bwmeta1.element.baztech-article-BPL6-0014-0070/c/httpwibis_pollub_plfilesplikikonferencje32.pdf, last downloaded Mar. 5, 2014.

Bonnie Biafore, "Fast-track tasks to shorten your project schedule—Project—Office.com", http://office.microsoft.com/en-in/project-help/fast-track-tasks-to-shorten-your-project-schedule-HA010036399.aspx, last downloaded Mar. 5, 2014.

Features: Task Management, Zilicus PM Project planing & collaboration software, http://www.zilicus.com/features/task-management.html, last downloaded Mar. 5, 2014.

Danny Holten, "Hierarchical Edge Bundles: Visualization of Adjacency Relations in Hierarchical Data", IEEE Transactions on Visualization and Computer Graphics, vol. 12, No. 5, Sep./Oct. 2006, http://www.win.tue.nl/~dholten/papers/bundles_infovis.pdf, last downloaded Mar. 5, 2014.

How to Create Project Schedule Part II, Elementool Project Management Blog, http://www.elementool.com/blog/?p=238, last downloaded Mar. 5, 2014.

Zhenhua Guo et al., "Improving Resource Utilization in MapReduce", School of Informatics and Computing, Indiana University, US, http://grids.ucs.indiana.edu/ptliupages/publications/Improve_Resource_Utilization_MapReduce_V8.pdf, last downloaded Mar. 5, 2014.

Microsoft Project—Project Management Features, http://office.microsoft.com/en-us/project/project-management-and-ppm-showcase-microsoft-project-FX103802304.aspx, last downloaded Mar. 5, 2014.

Microsoft Project—Project Portfolio Management Features, http://office.microsoft.com/en-us/project/project-management-and-ppm-showcase-microsoft-project-FX103802304.aspx, last downloaded Mar. 5, 2014.

Download Microsoft Project for the masses from Official Microsoft Download Centre, "Microsoft Project for the masses", http://www.microsoft.com/en-in/download/details.aspx?id=25194, last downloaded Mar. 5, 2014.

Project Management Software—Quick Tour, "MinuteMan Systems", http://www.minuteman-systems.com/QuickTour.htm, last downloaded Mar. 5, 2014.

Oracle Primavera, Oracle Data Sheet, "Oracle's Primavera P6 Enterprise Project Portfolio Management", Copyright 2013.

OmniPlan, version 2.0.1 Manual, http://downloads2.omnigroup.com/software/MacOSX/Manuals/OmniPlan-2-Manual.pdf, last downloaded Mar. 5, 2014.

Wolfgang Wahlster et al., "Plan-based Integration of Natural Language and Graphics Generation", Jan. 1993, http://scidok.sulb.uni-saarland.de/volltexte/2013/5011/pdf/RR_93_02_.pdf, last downloaded Mar. 5, 2014.

Top Down and Bottom Up Planning Project Management Tool Set, "PM Tool with Top Down Planning Design and Bottom Up Processing Strategic Approach", http://2-plan.com/free-project-management-software-2-plan-desktop/top-down-and-bottom-up-planning-project-management-tool-set.html, last downloaded Mar. 5, 2014.

Project Management Shortcuts: Resource Leveling Made Easy—Liquid Planner, http://www.liquidplanner.com/blog/project-management-shortcuts-resource-leveling-made-easy/, last downloaded Mar. 5, 2014.

RationalPlan Project Management Software—MultiProject Version, http://www.rationalplan.com/multi-project-management-software.php, last downloaded Mar. 5, 2014.

Scheduling Projects Reference 1, http://www.openxprocess.com/help/reference/scheduler/overview.html, last downloaded Mar. 5, 2014.

(56) References Cited

OTHER PUBLICATIONS

Scheduling Projects Reference 2, http://www.openxprocess.com/help/reference/scheduler/specify_tasks.html, last downloaded Mar. 5, 2014.

Andy Carmichael, Ph.D.,CEng, FBCS, "Planning by Priority, How to prioritize project tasks to maximize delivered business benefits", Ivis Technologies, Issue 2.0, Scheduling Projects Reference 3, http://www.openxprocess.com/whitepapers/Planning%20By%20Priority%20_04_.pdf, last downloaded Mar. 5, 2014.

Asana Guide, The path to doing great things, "Sorting & Filtering", https://asana.com/guide/projects/sorting, last downloaded Mar. 5, 2014.

TaskInsight 3.0 Task Manager Updates Timeline Graphics and Functionality, http://prmac.com/release-id-29274.htm, last downloaded Mar. 5, 2014.

Anant Shree Agrawal, "Task Prioritization Rules for Project Execution", (IJERA) ISSN: 2248-9622, vol. 2, Issue 4, Jul.-Aug. 2012, pp. 1208-1212, http://www.ijera.com/papers/Vol2_issue4/GT2412081212.pdf, last downloaded Mar. 5, 2014.

Time Management Software—Get Things Done with Achieve Planner Task Management, http://www.effexis.com/achieve/planner.htm, last downloaded Mar. 5, 2014.

Use top-down planning to create summary tasks (or phases)—Project—Office.com, http://office.microsoft.com/en-in/project-help/use-top-down-planning-to-create-summary-tasks-or-phases-HA010376809.aspx, last downloaded Mar. 5, 2014.

VMware Horizon Mirage Web Manager Guide, v4.2, Jun. 2013, http://www.vmware.com/pdf/mirage-web-manager-guide-42.pdf, last downloaded Mar. 5, 2014.

What is Project Management—Lean Kit, http://leankit.com/project-management/what-is-project-management/, last downloaded Mar. 5, 2014.

Workforce Scheduler, Employee Scheduling Software Saves Time and Money and Gets People Working, by Kronos www.kronos.com/Scheduling-Software/Employee-Scheduling-Software.aspx, last downloaded Mar. 5, 2014.

\* cited by examiner

GRAPHICAL TOP-DOWN PLANNING SYSTEM

FIELD

One embodiment is directed to a computer system, and more particularly, to a computer system that displays data.

BACKGROUND

"Top-down planning" is the process of identifying an element of a project or endeavor, and creating a hierarchy of sub-elements by breaking down the identified element into a number of sub-elements, breaking down a sub-element into a number of further sub-elements, etc. Sub-elements are required to be completed in order to complete the identified element, and a summation of the hierarchy of sub-elements is equal to the identified element. Top-down planning is frequently used for budget distribution, work distribution, etc. For example, an overall project may be to construct a bridge on a budget of $100,000,000. Top-down planning breaks down the overall project into the individual steps required to construct the bridge, such as constructing 10 pillars, transporting 100 concrete slabs, placing all the concrete slabs in the correct places, etc. The $100,000,000 budget is also broken down and associated with each individual step that needs to be accomplished. For example, the construction of the 10 pillars is associated with a cost that is a portion of the $100,000,000 budget, the transportation of the 100 concrete slabs is associated with a cost that is another portion of the $100,000,000 budget, etc.

A form of planning that is complementary to "top-down planning" is "bottom-up planning." "Bottom-up planning" is where smallest elements are defined first, and then grouped into bigger elements, etc. Thus, an entire project or endeavor is defined from the smallest element upwards. In many practical scenarios, bottom-up planning and top-down planning results in different planning metrics. In these scenarios, it is typical to compare the bottom-up plan and the top-down plan visually, side-by-side, and consolidate the two plans (or portions thereof).

SUMMARY

One embodiment is a system that visually represents a planning structure. The system displays a first node that represents a first element of the planning structure and a first value associated with the first element within a user interface, where the first node has a first outline. The system further receives a first user interaction that is a movement of a cursor over the first node in a first direction. The system further generates a second element and a third element within the planning structure in response to the first user interaction, where the second element and the third element are children of the first element. The system further generates a second value associated with the second element and a third value associated with the third element, where a combination of the second value and the third value is equal to the first value. The system further displays a second node that represents the second element of the planning structure and the second value, and a third node that represents the third element of the planning structure and the third value within the user interface, where the second node and the third node each have the first outline. The system further displays a first line between the first node and the second node and a second line between the first node and the third node within the user interface, where the first line and the second line each represent a parent-child relationship. The system further modifies a display of the first node to have a second outline instead of the first outline.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Figure 1:
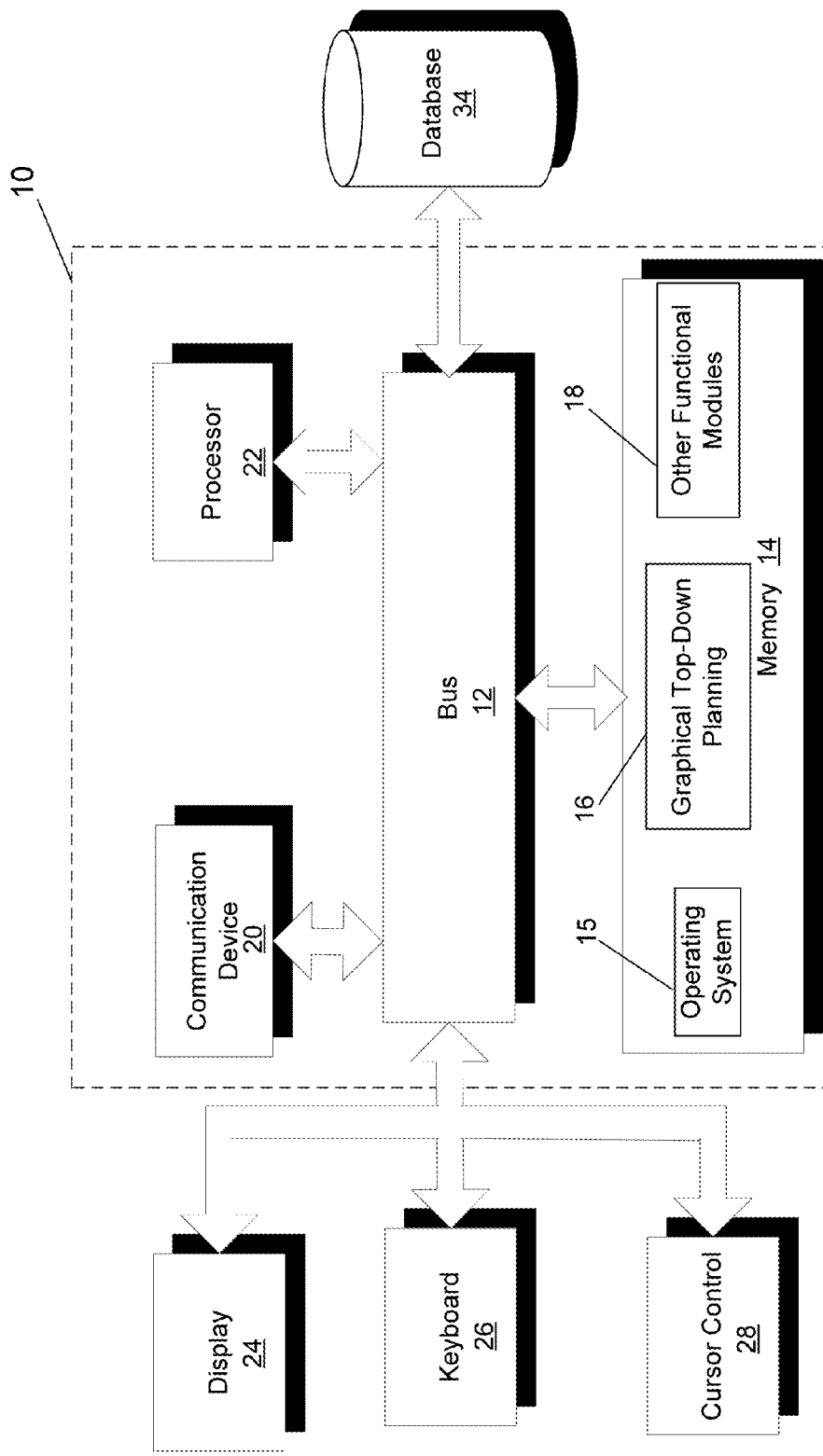
FIG. 1 illustrates a block diagram of a system that can implement an embodiment of the invention.

According to an embodiment, a graphical top-down planning system that includes a graphical user interface (or "user interface") is provided. The graphical top-down planning system can visually perform "top-down planning" for any parameter, such as work effort (e.g., resource hours) or work capital (e.g., project budget). "Top-down planning" is the process of identifying an element of a project or endeavor, and creating a hierarchy of sub-elements by breaking down the identified element into a number of sub-elements, breaking down a sub-element into a number of further sub-elements, etc. A summation of the hierarchy of sub-elements is equal to the identified element. The graphical top-down planning system can generate a planning structure that includes the identified element and the hierarchy of sub-elements, and can further visually represent the planning structure within the user interface, where the planning structure includes multiple nodes, and a node represents either the element or a sub-element. The graphical top-down planning system can further visually mange the planning structure, allowing for: (a) editing of the planning structure; (b) linking of any node of the planning structure to any node of one or more additional planning structures (such as top-down planning structures or bottom-up planning structures); (c) visual comparison of the planning structure and one or more linked planning structures; (d) saving of the planning structure as a planning template; or (e) applying any planning template to a node of the planning structure.

As previously described, top-down planning is the process of identifying an element of a project or endeavor, and creating a hierarchy of sub-elements by breaking down the identified element into a number of sub-elements, where a summation of the hierarchy of sub-elements is equal to the identified element. In relevant industries, top-down planning is typically done by first creating a tree (or some other type of planning structure), subsequently applying a value to a root element of the tree (i.e., at a parent element), and further applying values to all descendant elements of the root element except for the last descendant element, which gets a remainder value (i.e., root element value−summation of all descendant element values, except for last descendant element=last descendant element value). This process can then be repeated for every parent element.

There are at least two problems with this known approach. First, in this approach, the tree is created first, and then the values are assigned. Thus, tree creation and value distribution are two separate processes that are not coordinated. Second, in this approach, the value distribution is not visually represented. Therefore, this approach is not conducive for making corrections to the breakdown of an element into a hierarchy of sub-elements.

As also previously described, a complementary form of planning is bottom-up planning, where bottom-up planning is where smallest elements are defined first, and then grouped into bigger elements, etc. In relevant industries, there are several ad-hoc planning solutions, but they generally do not allow visual top-down planning, as well as a visual comparison between a top-down planning structure and a bottom-up planning structure. In general, they also do not allow for a visual adjustment, or modification, of a planning structure. While some of the ad-hoc planning solutions are text-based or number-based, these ad-hoc planning solutions generally do not include a visual component. This can make it difficult to provide a conceptual comparative understanding of the planning structures to a user.

FIG. 1 illustrates a block diagram of a system 10 that can implement one embodiment of the invention. System 10 includes a bus 12 or other communications mechanism for communicating information between components of system 10. System 10 also includes a processor 22, operatively coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. System 10 further includes a communication device 20, such as a network interface card or other communications interface, to provide access to a network. As a result, a user may interface with system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with system 10.

According to one embodiment, memory 14 can store software modules that may provide functionality when executed by processor 22. The modules can include an operating system 15, a graphical top-down planning module 16, as well as other functional modules 18. Operating system 15 can provide an operating system functionality for system 10. Graphical top-down planning module 16 can provide functionality for visually representing a planning structure. In certain embodiments, graphical top-down planning module 16 can comprise a plurality of modules, where each module provides specific individual functionality for visually representing a planning structure. System 10 can also be part of a larger system. Thus, system 10 can include one or more additional functional modules 18 to include the additional functionality. For example, functional modules 18 may include modules that provide additional functionality, such as functionality of a "Primavera Enterprise Project Portfolio Management" product by Oracle Corporation.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

Figure 2:
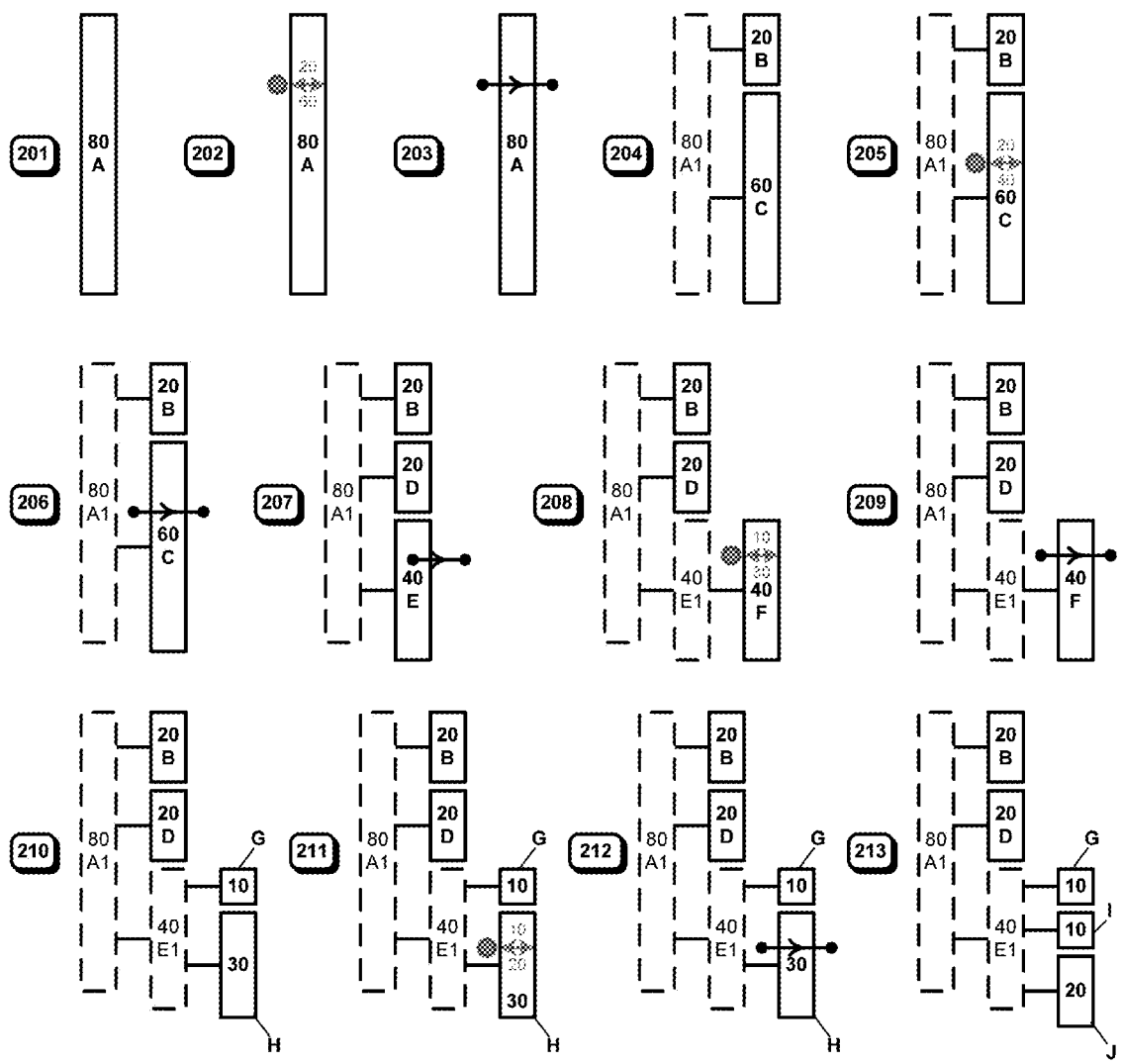
FIG. 2 illustrates a generation of a planning structure that is displayed by a graphical top-down planning system, according to an embodiment of the invention.

FIG. 2 illustrates a generation of a planning structure that is displayed by a graphical top-down planning system, according to an embodiment of the invention. A planning structure is a structure that can be used to plan an overall project, goal, or objective. A planning structure includes a root element, and optionally includes a hierarchy of one or more descendant elements, where the root element has a hierarchical relationship with each descendant element. The root element can represent the overall project, goal, or objective. The root element can further be broken down into one or more child elements, where each child element of the root element can represent a task or task group that the overall project, goal, or objective can be broken down into. Thus, the root element has a parent-child relationship with each child element. Further, each child element can be broken down into one or more grandchild elements, where each grandchild element can represent a task or task group that the task or task group associated with the child element can be broken down into. Thus, the child element has a parent-child relationship with each grandchild element. The breakdown of an element into one or more child elements can continue for any number of hierarchy levels within the planning structure.

A root element can have an associated value, where the value represents a value of the overall project, goal, or objective. For example, the value associated with the root element can represent a total budget for an overall project, or a total number of resource hours for the overall project. Further, each child element can also have an associated value, where a summation of values associated with child elements is equal to a value associated with a parent element. For example, a root element can have an associated value of "10." The root element can have two child elements, each child element having an associated value of "5." Further, the first child element can have three child elements of its own (i.e., three grandchild elements of the root element), where the first child element has an associated value of "1,", the second child element has an associated value of "2," and the third child element has an associated value of "1".

According to an embodiment, the graphical top-down planning system can display a planning structure within a user interface by displaying nodes within the user interface, where the nodes represent the elements of the planning structure. In certain embodiments, each node can be displayed as a vertical bar, where a length of the vertical bar is proportional to the value associated with the corresponding element of the planning structure. In other embodiments, each node can be displayed as a horizontal bar, where a width of the horizontal bar is proportional to the value associated with the corresponding element of the planning structure. Further, in certain embodiments, if a node represents a parent element (i.e., an element with at least one child), the node can be displayed with a dashed outline. Further if a node represents a non-parent element (i.e., an element with no children), the node can be displayed with a solid outline. The graphical top-down planning system can further display the planning structure within a user interface by displaying connecting lines between the nodes, where each connecting line connects two nodes, and where each connecting line represents a parent-child relationship. In the embodiments where the nodes are displayed as vertical bars, the node to the left of the connecting line can represent the parent element, and the node to the right of the connecting line can represent the child element. Further, in the embodiments where the nodes are displayed as horizontal bars, the node to the top of the connecting line can represent the parent element, and the node to the bottom of the connecting line can represent the child element.

FIG. 2 includes a planning structure 201. Planning structure 201 is a visual representation of a planning structure that is displayed within a user interface by the graphical top-down planning system. Planning structure 201 is an example of a planning structure that solely includes a root element. Planning structure 201 includes node A, where node A is a representation of the root element. In the illustrated embodiment, node A is displayed as a vertical bar with a solid outline. However, in alternate embodiments, node A can be displayed in a different format, such as a horizontal bar. Node A has an associated value of "80," and thus, the graphical top-down planning system displays the value "80" within node A. As an example, node A can represent an overall task (such as constructing a bridge), and the value "80" can represent a metric associated with the overall task (such as resource hours). As is described below in greater detail, in conjunction with FIGS. 2-6, the graphical top-down planning system can support several user interactions with the user interface. Example user interactions include, "hover," "slice through," "push down," "push up," "merge," "strike out," "resize," "save as template," "apply template," "link node," "unlink node," and "view linked details".

FIG. 2 further includes a planning structure 202 that is displayed by the graphical top-down planning system. Planning structure 202 is identical to planning structure 201, except that a user has placed a cursor at a specific position (illustrated in planning structure 202 of FIG. 2 as a dark circle). In certain embodiments, the user can place the cursor at the position using a cursor control, such as a mouse. In other embodiments, the user can place the cursor at the position by "tapping" (or otherwise making contact with) the user interface at the position with a finger, stylus, or some other type of user input equipment. This is an example of a "hover" user interaction. According to the embodiment, in response to the "hover" user interaction, the graphical top-down planning system can identify that the cursor is placed at a position that is within a pre-determined distance from node A. The graphical top-down planning system can further identify that the cursor is placed at the position for a pre-determined duration. Based on these determinations, the graphical top-down planning system can predict that the next user interaction will be a "slice through" user interaction (described below in greater detail). Based on this prediction, the graphical top-down planning system displays values of the resultant child nodes which would be created if node A is "sliced through" at the position of the cursor. In the illustrated embodiment, within planning structure 202, the resultant values, "20" and "60," are displayed within node A.

FIG. 2 further includes a planning structure 203 that is displayed by the graphical top-down planning system. Planning structure 203 is identical to planning structure 201, except that the user has moved the cursor over node A in a horizontal direction from left to right (illustrated in planning structure 203 of FIG. 2 as two dark circles, which represent a starting point and ending point of the cursor movement, and a dark line, which represents the cursor movement). In certain embodiments, the cursor can be moved over node A using a cursor control, such as a mouse. In other embodiments, the cursor can be moved by "swiping" the user interface with a finger, stylus, or some other type of user input equipment. This is an example of a "slice through" user interaction. According to the embodiment, in response to the "slice through" user interaction, the graphical top-down planning system can identify that node A represents a root element. The graphical top-down planning system can further generate two child elements within planning structure 203 that are children of the root element, and can generate two values associated with the two child elements, where a combination of the two values associated with the two child elements is equal to the value associated with the root element. FIG. 2 further includes a planning structure 204 that is displayed by the graphical top-down planning system. Planning structure 204 includes node A1, which replaces node A. Node A1 is identical to node A, except node A1 has a dashed outline instead of a solid outline. Planning structure 204 further includes node B, which is a representation of the first child element, and node C, which is a representation of the second child element. In the illustrated embodiment, nodes B and C are displayed as vertical bars, where there is a gap between nodes B and C. Node B has an associated value of "20," that is displayed within node B. Further, node C has an associated value of "60," that is displayed within node C. Two connecting lines are further displayed: a first connecting line that connects node A with node B, and a second connecting line that connects node A with node C. Thus, nodes B and C represent a breakdown of the overall task represented by node A into two individual sub-tasks. Further, the values "20" and "60" associated with nodes B and C, respectively, represent a breakdown of the value "80" associated with node A.

FIG. 2 also includes a planning structure 205 that is displayed by the graphical top-down planning system. Planning structure 205 is identical to planning structure 204, except that a user has placed a cursor at a specific position (illustrated in planning structure 205 of FIG. 2 as a dark circle). This is another example of a "hover" user interaction. According to the embodiment, in response to the "hover" user interaction, the graphical top-down planning system can identify that the cursor is placed at a position that is within a pre-determined distance from node C, and can further identify that the cursor is placed at the position for a pre-determined duration. Based on these determinations, the graphical top-down planning system can predict that the next user interaction will be a "slice through" user interaction. Based on this prediction, the graphical top-down planning system displays values of the resultant child nodes which would be created if node C is "sliced through" at the position of the cursor. In the illustrated embodiment, the resultant values, "20" and "40," are displayed within node C.

FIG. 2 also includes a planning structure 206 that is displayed by the graphical top-down planning system. Planning structure 206 is identical to planning structure 204, except that the user has moved the cursor over node C in a horizontal direction from left to right (illustrated in planning structure 206 of FIG. 2 as two dark circles, which represent a starting point and ending point of the cursor movement, and a dark line, which represents the cursor movement). This is another example of a "slice through" user interaction. According to the embodiment, in response to the "slice through" user interaction, the graphical top-down planning system can identify that node C represents a non-root element. The graphical top-down planning system can further replace the non-root element within planning structure 206 with two child elements that are children of a parent element of the non-root element (i.e., the element represented by node A1). The graphical top-down planning system can further generate two values associated with the two child elements, where a combination of the two values associated with the two child elements is equal to the value associated with the non-root element (i.e., the element represented by node C). FIG. 2 further includes a planning structure 207 that is displayed by the graphical top-down planning system. Planning structure 207 includes nodes D and E, which replace node C. Node D is a representation of the first child element, and node E is a representation of the second child element. In the illustrated embodiment, nodes D and E are displayed as vertical bars, where there is a gap between nodes D and E. Node D has an associated value of "20," that is displayed within node D. Further, node E has an associated value of "40," that is displayed within node E. Two connecting lines are further displayed: a first connecting line that connects node A1 with node D, and a second connecting line that connects node A1 with node E. Thus, nodes D and E represent a breakdown of the individual sub-task previously represented by node C into two individual sub-tasks. Further, the values "20" and "40" associated with nodes D and E, respectively, represent a breakdown of the value "60" previously associated with node C.

Further, in planning structure 207 of FIG. 2, the user has "dragged" node E in a horizontal direction from left to right (illustrated in planning structure 207 of FIG. 2 as two dark circles, which represent a starting point and ending point of the cursor movement, and a dark line, which represents the cursor movement). In certain embodiments, node E can be "dragged" using a cursor control, such as a mouse. In other embodiments, node E can be dragged by swiping the user interface with a finger, stylus, or some other type of user input equipment. This is an example of a "push down" user interaction. According to the embodiment, in response to the "push down" user interaction, the graphical top-down planning system can generate a child element within planning structure 207 that is a child of the element previously represented by node E, and can generate a value associated with the child element, where the value associated with the child element is equal to the value of the element previously represented by node E. FIG. 2 further includes a planning structure 208 that is displayed by the graphical top-down planning system. Planning structure 208 includes node E1, which replaces node E. Node E1 is identical to node E, except node E1 has a dashed outline instead of a solid outline. Planning structure 208 further includes node F, which is a representation of the child element. In the illustrated embodiment, node F is displayed as a vertical bar. Node F has an associated value of "40," that is displayed within node F. Further, a connecting line is displayed that connects node E1 with node F. Thus, node F represents a push of the task previously represented by node E down a hierarchical level.

Further, in planning structure 208 of FIG. 2, a user has placed a cursor at a specific position (illustrated in planning structure 208 of FIG. 2 as a dark circle). This is another example of a "hover" user interaction. According to the embodiment, in response to the "hover" user interaction, the graphical top-down planning system can identify that the cursor is placed at a position that is within a pre-determined distance from node F, and can further identify that the cursor is placed at the position for a pre-determined duration. Based on these determinations, the graphical top-down planning system can predict that the next user interaction will be a "slice through" user interaction. Based on this prediction, the graphical top-down planning system displays values of the resultant child nodes which would be created if node F is "sliced through" at the position of the cursor. In the illustrated embodiment, the resultant values, "10" and "30," are displayed within node F.

FIG. 2 further includes a planning structure 209 that is displayed by the graphical top-down planning system. Planning structure 209 is identical to planning structure 208, except that the user has moved the cursor over node F in a horizontal direction from left to right (illustrated in planning structure 209 of FIG. 2 as two dark circles, which represent a starting point and ending point of the cursor movement, and a dark line, which represents the cursor movement). According to the embodiment, in response to the "slice through" user interaction, the graphical top-down planning system can identify that node F represents a non-root element. The graphical top-down planning system can further replace the non-root element within planning structure 209 with two child elements that are children of a parent element of the non-root element (i.e., the element represented by node E1). The graphical top-down planning system can further generate two values associated with the two child elements, where a combination of the two values associated with the two child elements is equal to the value associated with the non-root element (i.e., the element represented by node F). FIG. 2 further includes a planning structure 210 that is displayed by the graphical top-down planning system. Planning structure 210 includes nodes G and H, which replace node F. Node G is a representation of the first child element, and node H is a representation of the second child element. In the illustrated embodiment, nodes G and H are displayed as vertical bars, where there is a gap between nodes G and H. Node G has an associated value of "10," that is displayed within node G. Further, node H has an associated value of "30," that is displayed within node H. Two connecting lines are further displayed: a first connecting line that connects node E1 with node G, and a second connecting line that connects node E1 with node H. Thus, nodes G and H represent a breakdown of the individual sub-task previously represented by node F into two individual sub-tasks. Further, the values "10" and "30" associated with nodes G and H, respectively, represent a breakdown of the value "40" previously associated with node F.

FIG. 2 also includes a planning structure 211 that is displayed by the graphical top-down planning system. Planning structure 211 is identical to planning structure 210, except that the user has placed a cursor at a specific position (illustrated in planning structure 211 of FIG. 2 as a dark circle). This is another example of a "hover" user interaction. According to the embodiment, in response to the "hover" user interaction, the graphical top-down planning system can identify that the cursor is placed at a position that is within a pre-determined distance from node H, and can further identify that the cursor is placed at the position for a pre-determined duration. Based on these determinations, the graphical top-down planning system can predict that the next user interaction will be a "slice through" user interaction. Based on this prediction, the graphical top-down planning system displays values of the resultant child nodes which would be created if node H is "sliced through" at the position of the cursor. In the illustrated embodiment, the resultant values, "10" and "20," are displayed within node H within the user interface.

FIG. 2 also includes a planning structure 212 that is displayed by the graphical top-down planning system. Planning structure 212 is identical to planning structure 211, except that the user has moved the cursor over node H in a horizontal direction from left to right (illustrated in planning structure 212 of FIG. 2 as two dark circles, which represent a starting point and ending point of the cursor movement, and a dark line, which represents the cursor movement). This is another example of a "slice through" user interaction. According to the embodiment, in response to the "slice through" user interaction, the graphical top-down planning system can identify that node H represents a non-root element. The graphical top-down planning system can further replace the non-root element within planning structure 212 with two child elements that are children of a parent element of the non-root element (i.e., the element represented by node E1). The graphical top-down planning system can further generate two values associated with the two child elements, where a combination of the two values associated with the two child elements is equal to the value associated with the non-root element (i.e., the element represented by node H). FIG. 2 further includes a planning structure 213. Planning structure 213 includes nodes I and J, which replace node H. Node I is a representation of the first child element, and node J is a representation of the second child element. In the illustrated embodiment, nodes I and J are displayed as vertical bars, where there is a gap between nodes I and J. Node I has an associated value of "10," that is displayed within node I. Further, node J has an associated value of "20," that is displayed within node J. Two connecting lines are further displayed: a first connecting line that connects node E1 with node I, and a second connecting line that connects node E1 with node J. Thus, nodes I and J represent a breakdown of the individual sub-task previously represented by node H into two individual sub-tasks. Further, the values "10" and "20" associated with nodes I and J, respectively, represent a breakdown of the value "30" previously associated with node H.

Figure 3:
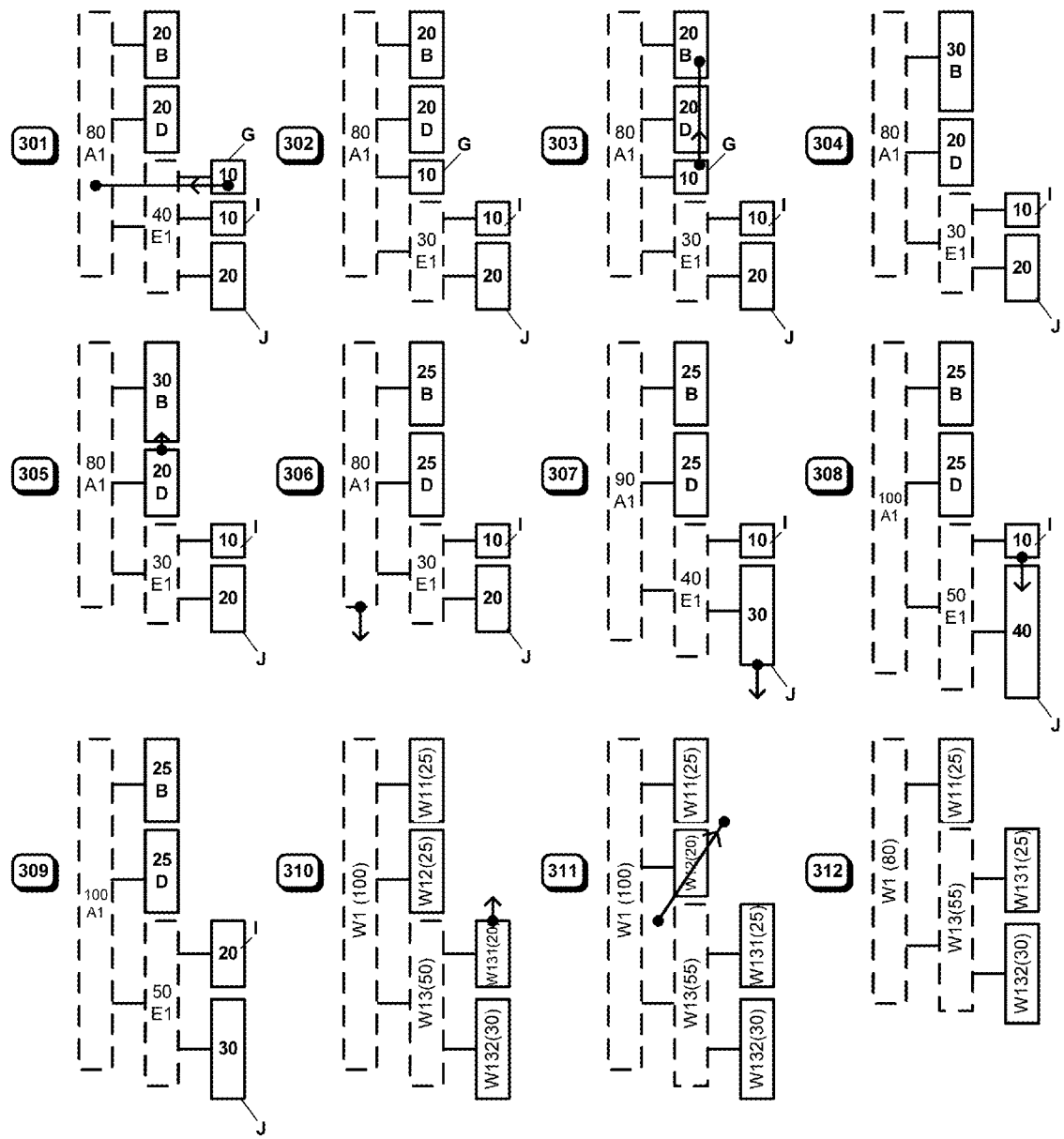
FIG. 3 illustrates an editing of a planning structure that is displayed by a graphical top-down planning system, according to an embodiment of the invention.

FIG. 3 illustrates an editing of a planning structure that is displayed by a graphical top-down planning system, according to an embodiment of the invention. FIG. 3 includes planning structure 301 that is displayed by the graphical top-down planning system. Planning structure 301 is identical to planning structure 213 of FIG. 2, except that the user has dragged node G in a horizontal direction from right to left (illustrated in planning structure 301 of FIG. 3 as two dark circles, which represent a starting point and ending point of the cursor movement, and a dark line, which represents the cursor movement), where node G has been dragged onto node A1. This is an example of a "push up" user interaction. According to the embodiment, in response to the "push up" user interaction, the graphical top-down planning system can modify an element represented by node G within planning structure 301 to be a child of an element represented by node A1 instead of an element represented by node E1. FIG. 3 further includes planning structure 302 that is displayed by the graphical top-down planning system. Within planning structure 302, a position of node G is modified, so that node G is in a position that is one hierarchical level to the right of node A1. Further, a connecting line is modified so that the connecting line connects node A1, instead of node E1, with node G. Also, a value associated with node E1 is decreased from "40" to "30," the decreased value, "30," is displayed within node E1, and a size of node E1 is decreased in correlation to the decreased value. Thus, node G represents a push of the task represented by node G up a hierarchical level.

FIG. 3 also includes planning structure 303 that is displayed by the graphical top-down planning system. Planning structure 303 is identical to planning structure 302 of FIG. 3, except that the user has dragged node G in a vertical direction (illustrated in planning structure 303 of FIG. 3 as two dark circles, which represent a starting point and ending point of the cursor movement, and a dark line, which represents the cursor movement), where node G has been dragged onto node B. This is an example of a "merge" user interaction. According to the embodiment, in response to the "merge" user interaction, the graphical top-down planning system can modify a value associated with an element of planning structure 303 represented by node B to equal a combination of the value and a value associated with an element of planning structure 303 represented by node G. In other words, the value of "20" associated with node B is combined with the value of "10" associated with node G to equal the value of "30". The graphical top-down planning system can further delete the element represented by node G from planning structure 303. FIG. 3 also includes planning structure 304 that is displayed by the graphical top-down planning system. Within planning structure 304, node G is deleted, and a connecting line that connected node A1 with node G is also deleted. Further, the increased value, "30" is displayed within node B, and a size of node B is increased in correlation to the increased value.

Although not illustrated in FIG. 3, other "push up," "push down," and "merge" user interactions can be supported by the graphical top-down planning system. For example, a user can drag a node that represents a parent element of a planning structure in a horizontal direction from left to right, where the node is dragged onto a node that represents a non-parent element (i.e., an element without any children) of the planning structure. The node that represents the parent element moves to the position of the node that represents the non-parent element, and the node that represents the non-parent element is pushed down one hierarchical level, where the non-parent element is a child of the parent element. Further, a value that is associated with the parent element is modified to include a value associated with the non-parent element. As another example, a user can drag a node that represents a first parent element of a planning structure in a vertical direction, where the node is dragged onto a node that represents a second parent element of the planning structure. The first parent element, and the descendant elements of the first parent element, are deleted from the planning structure. The node that represents the first parent element, and the nodes that represents any descendant elements of the first parent element, are also deleted. The descendant elements of the first parent element become descendant elements of the second parent element. A value associated with the second parent element is modified to equal a combination of a value associated with the first parent element and the value associated with the second parent element. The node that represents the second parent element is modified to correspond to the modified value associated with the second parent element. The nodes that represent the descendant elements of the first parent element are displayed as descendant nodes of the node that represents the second parent element.

FIG. 3 also includes planning structure 305 that is displayed by the graphical top-down planning system. Planning structure 305 is identical to planning structure 304 of FIG. 3, except that the user has dragged an edge of node D in a vertical direction (illustrated in planning structure 303 of FIG. 3 as a dark circle, which represent a starting point of the cursor movement, and a dark line, which represents the cursor movement), where the vertical direction is bottom to top. This is an example of a "resize" user interaction. According to the embodiment, in response to the "resize" user interaction, the graphical top-down planning system can increase a value associated with an element represented by node D from "20" to "25." The graphical top-down planning system can further decrease a value associated with an element represented by node B (which is a sibling element to the element represented by node D) from "30" to "25." FIG. 3 also includes planning structure 306 that is displayed by the graphical top-down planning system. Within planning structure 306, the increased value, "25," is displayed within node D, a size of node D is increased in correlation to the increased value, the decreased value, "25," is displayed within node B, and a size of node B is decreased in correlation to the decreased value. This is an example of an "intermediate edge resize" user interaction, where an intermediate edge (i.e., an edge that is not a top edge or a bottom edge of a planning structure) of a node that represents an element is dragged either towards or away from a node that represents a sibling element. In this case, an intermediate edge of node D is dragged towards node B. Because the intermediate edge of node D is dragged towards node B, a value associated with node B increases (and a size of node D correspondingly increases), and a value associated with node B decreases (and a size of node D correspondingly decreases). In addition, if an upper intermediate edge of node E1 is dragged towards node D (not illustrated in either planning structure 505 or 506 of FIG. 5), a value associated with node D decreases (and a size of node correspondingly decreases), but values associated with nodes E1 and I increase by an identical amount (and sizes of nodes E1 and I correspondingly increase). This is because a lower intermediate edge of node D, and upper intermediate edges of nodes E1 and I, all are positioned along (or "adjacent to") an identical intermediate edge.

Further, in planning structure 306 of FIG. 3, the user has dragged an edge of node A1 in a vertical direction (illustrated in planning structure 306 of FIG. 3 as a dark circle, which represent a starting point of the cursor movement, and a dark line, which represents the cursor movement), where the vertical direction is top to bottom. This is another example of a "resize" user interaction. According to the embodiment, in response to the "resize" user interaction, the graphical top-down planning system can increase a value associated with an element represented by node A1 from "80" to "90." The graphical top-down planning system can further increase a value associated with an element represented by node E1 (which is a descendant element of the element represented by node A1) from "30" to "40," and can further increase a value associated with an element represented by node J (which is also a descendant element of the element represented by node A1) from "20" to "30." FIG. 3 also includes planning structure 307 that is displayed by the graphical top-down planning system. Within planning structure 307, the increased value, "90," is displayed within node A1, a size of node A1 is increased in correlation to the increased value, an increased value, "40," is displayed within node E1, a size of node E1 is increased in correlation to the increased value, an increased value, "30," is displayed within node J, and a size of node J has increased in correlation to the increased value. This is an example of an "end edge resize" user interaction, where an edge of a node that represents an element that is positioned along (or adjacent to) an end edge of the planning structure (i.e., either a top edge or a bottom edge of the planning structure) is dragged either towards or away from the planning structure. In this case, an end edge of node A1 is dragged away from planning structure 306. Because the end edge of node A1 is dragged away from planning structure 306, a value associated with node A1 increases (and a size of node A1 correspondingly increases), a value associated with node E1 increases (and a size of node E1 correspondingly increases), and a value associated with node J increases (and a size of node J correspondingly increases).

Further, in planning structure 307 of FIG. 3, the user has dragged an edge of node J in a vertical direction (illustrated in planning structure 307 of FIG. 3 as a dark circle, which represent a starting point of the cursor movement, and a dark line, which represents the cursor movement), where the vertical direction is top to bottom. This is another example of a "resize" user interaction. According to the embodiment, in response to the "resize" user interaction, the graphical top-down planning system can increase a value associated with an element represented by node J from "30" to "40." The graphical top-down planning system can further increase a value associated with an element represented by node E1 (which is an ancestor element to the element represented by node J) from "40" to "50," and can further increase a value associated with an element represented by node A1 (which is also an ancestor element to the element represented by node J) from "90" to "100." FIG. 3 also includes planning structure 308 that is displayed by the graphical top-down planning system. Within planning structure 308, an increased value, "40," is displayed within node J, a size of node J is increased in correlation to the increased value, an increased value, "50," is displayed within node J, a size of node E1 is increased in correlation to the increased value, an increased value, "100," is displayed within node A1, and a size of node A1 is increased in correlation to the increase of the associated value. This is another example of an "end edge resize" user interaction, where an edge of a node that represents an element that is positioned along (or adjacent to) an end edge of the planning structure is dragged either towards or away from the planning structure. In this case, an end edge of node J is dragged away from planning structure 307. Because the end edge of node J is dragged away from planning structure 307, a value associated with node J increases (and a size of node J correspondingly increases), a value associated with node E1 increases (and a size of node E1 correspondingly increases), and a value associated with node A1 increases (and a size of node A1 correspondingly increases).

Further, in planning structure 308 of FIG. 3, the user has dragged an edge of node I in a vertical direction (illustrated in planning structure 308 of FIG. 3 as a dark circle, which represent a starting point of the cursor movement, and a dark line, which represents the cursor movement), where the vertical direction is top to bottom. This is another example of a "resize" user interaction. According to the embodiment, in response to the "resize" user interaction, the graphical top-down planning system can increase a value associated with an element represented by node I from "10" to "20." The graphical top-down planning system can further decrease a value associated with an element represented by node J (which is a sibling element to the element represented by node I) from "40" to "30." FIG. 3 also includes planning structure 309 that is displayed by the graphical top-down planning system. Within planning structure 309, an increased value, "20," is displayed within node I, a size of node I is increased in correlation to the increased value, a decreased value, "30," is displayed within node J, and a size of node J is decreased in correlation to the decreased value. This is another example of an "intermediate edge resize" user interaction, where an intermediate edge of a node that represents an element is dragged either towards or away from a node that represents a sibling element. In this case, an intermediate edge of node I is dragged towards node J. Because the intermediate edge of node I is dragged towards node J, a value associated with node I increases (and a size of node I correspondingly increases), and a value associated with node J decreases (and a size of node J correspondingly decreases).

FIG. 3 also includes planning structure 310 that is displayed by the graphical top-down planning system. Planning structure 310 includes a root element represented by node W1 with an associated value of "100". Planning structure 310 further includes: a first child element that is a child of the root element represented by node W13 with a value of "50"; a second child element that is also a child of the root element represented by node W12 with a value of "25"; and a third child element that is also a child of the root element represented by node W11 with a value of "25". Planning structure 310 further includes: a first grandchild element that is a child of the first child element represented by node W132 with a value of "30"; and a second grandchild element that is a child of the first child element represented by node W131 with a value of "20". Planning structure 310 of FIG. 3 also illustrates that the graphical top-down planning system can provide names for the individual nodes. When a new child element is generated (either by a "slice through" user interaction or a "push-down" user interaction), a node that represents the child element can be given an automatically-generated name, such as the alphabetical automatically-generated names illustrated in planning structure 310 of FIG. 3. However, a user can choose to rename any node (either a node that represents a parent element or a node that represents a non-parent element) at any time. Any standard mechanism of naming or re-naming can be utilized by the graphical top-down planning system, such as a two-click mechanism, pressing a F2 key on a keyboard, a long tap combined with selecting "Rename" from a context menu, right-clicking combined with selecting "Rename" from a context menu, or selecting "Rename" from an edit menu. Further, during a "slice-through" user interaction, for any node that represents a non-root element, the given name can remain for a first element, and a second element can receive an automatically-generated name. In addition, for a "merge" user interaction, a name of a source element is removed (because the source element is merged into a destination element), and the source element is removed. Any algorithm can be utilized to automatically generate a name, such as adding a serial number to an end of a name (e.g., nodes that represents child elements of node A can be named nodes A1 and A2).

Further, in planning structure 310 of FIG. 3, the user has dragged an edge of node W131 in a vertical direction (illustrated in planning structure 310 of FIG. 3 as a dark circle, which represent a starting point of the cursor movement, and a dark line, which represents the cursor movement), where the vertical direction is bottom to top. This is another example of a "resize" user interaction. According to the embodiment, in response to the "resize" user interaction, the graphical top-down planning system can increase a value associated with an element represented by node W131 from "20" to "25." The graphical top-down planning system can further increase a value associated with an element represented by node W13 (which is an ancestor element to the element represented by node W131) from "50" to "55," and can further decrease a value associated with an element represented by node W12 (which is a sibling element to the element represented by node W13) from "25" to "20." FIG. 3 also includes planning structure 311 that is displayed by the graphical top-down planning system. Within planning structure 311, an increased value, "25," is displayed within node W131, a size of node W131 is increased in correlation to the increased value, an increased value, "55," is displayed within node W13, a size of node W13 is increased in correlation to the increased value, a decreased value, "20," is displayed within node W12, and a size of node W12 is decreased in correlation to the decreased value.

Further, in planning structure 311 of FIG. 3, the user has moved the cursor over node W12 in a diagonal direction from left bottom to right top (illustrated in planning structure 311 of FIG. 3 as two dark circles, which represent a starting point and ending point of the cursor movement, and a dark line, which represents the cursor movement). This is an example of a "strike through" user interaction. According to the embodiment, in response to the "strike through" user interaction, the graphical top-down planning system can delete an element represented by node W12 from planning structure 311, and decrease a value associated with an element represented by node W1 (which is an ancestor element of the element represented by node W12) from "100" to "80." In an alternate embodiment where the element represented by node W12 includes descendant elements, the graphical top-down planning system can delete the descendant elements as well. FIG. 3 also includes planning structure 312 that is displayed by the graphical top-down planning system. Within planning structure 312, node W12 is deleted, and a connecting line that connected node W1 with node W12 is also deleted. Further, the decreased value, "80," is displayed within node W1, and a size of node W1 is decreased in correlation to the decreased value. In an alternate embodiment where node W12 includes descendant nodes, the graphical top-down planning system can delete the descendant nodes as well.

Figure 4:
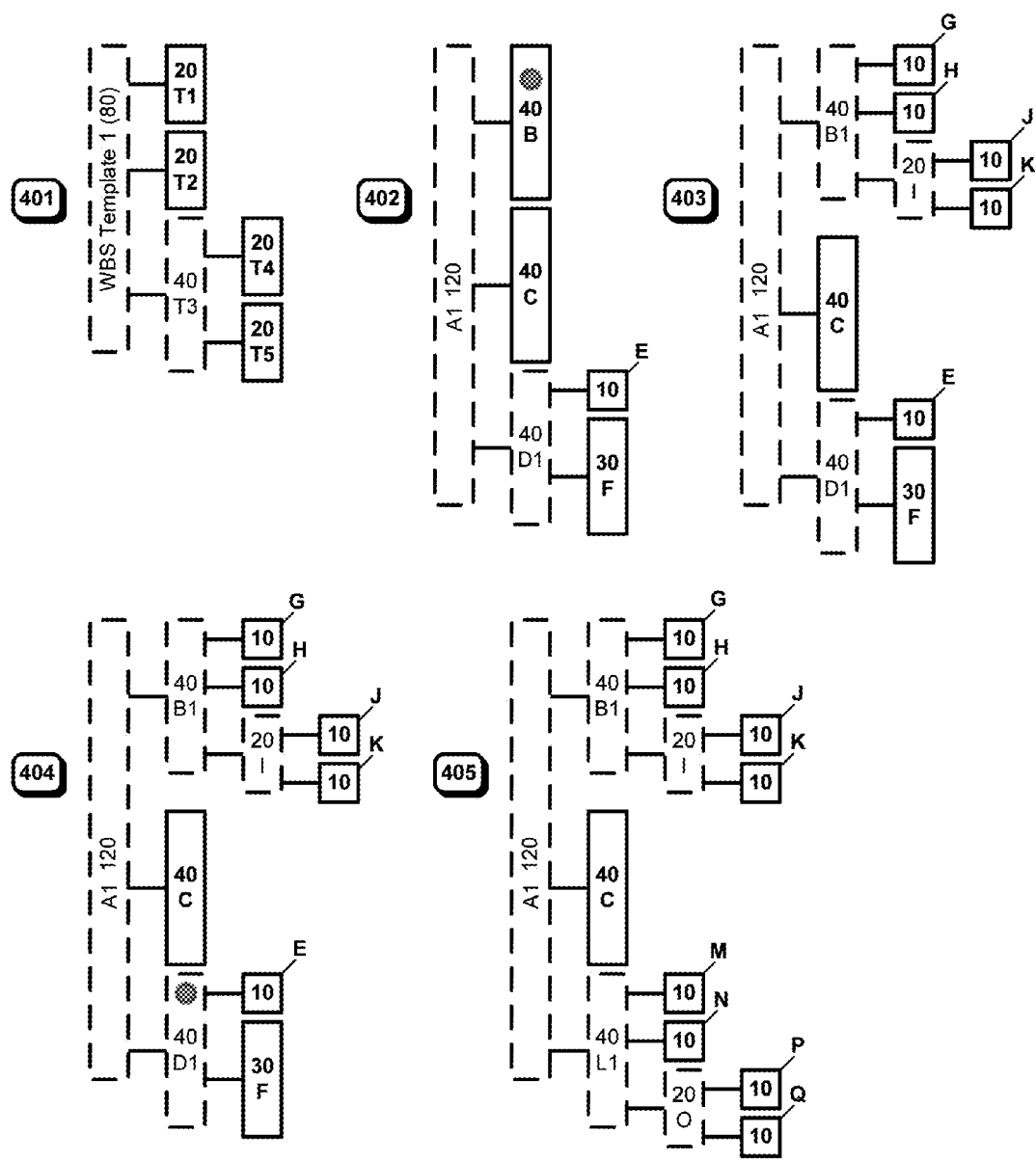
FIG. 4 illustrates a generation of a planning structure that is displayed by a graphical top-down planning system by using a planning template, and an application of the planning template to a node of the planning structure, according to an embodiment of the invention.

FIG. 4 illustrates a generation of a planning structure that is displayed by a graphical top-down planning system from a planning template, and an application of the planning template to a node of the planning structure, according to an embodiment of the invention. According to the embodiment, a planning template is a template that can be used to generate a planning structure, where a planning template can include a root element, and can optionally include a hierarchy of one or more descendant elements, where the root element has a hierarchical relationship with each descendant element. According to the embodiment, a user can select any element in a hierarchy by "clicking" (or "tapping") on a corresponding node, and then can choose to save the element, and the element's hierarchy of its descendant elements, as a planning template by selecting a menu item, button, icon, or some other user interface element that is displayed within the user interface (such as within a toolbar). This is an example of a "save as template" user interaction. According to the embodiment, in response to the "save as template" user interaction, the graphical top-down planning system can save a portion of a planning structure (or the entire planning structure if a node that corresponds to the root element was selected) as a planning template.

FIG. 4 includes planning template 401 which is a planning structure that is saved as a planning template. Planning template 401 includes a root element represented by node WBS Template 1 with an associated value of "80." Planning template 401 further includes: a first child element that is a child of the root element represented by node T3 with a value of "40"; a second child element that is also a child of the root element represented by node T2 with a value of "20"; and a third child element that is also a child of the root element represented by node T1 with a value of "20." Planning template 401 further includes: a first grandchild element that is a child of the first child element represented by node T5 with a value of "20"; and a second grandchild element that is a child of the first child element represented by node T4 with a value of "20."

FIG. 4 also includes planning structure 402 that is displayed by the graphical top-down planning system. Planning structure 402 includes a root element represented by node A1 with an associated value of "120." Planning structure 402 further includes: a first child element that is a child of the root element represented by node D1 with a value of "40"; a second child element that is also a child of the root element represented by node C with a value of "40"; and a third child element that is also a child of the root element represented by node B with a value of "40." Planning structure 402 further includes: a first grandchild element that is a child of the first child element represented by node F with a value of "30"; and a second grandchild element that is a child of the first child element represented by node E with a value of "10."

Further, in planning structure 402 of FIG. 4, the user has moved a cursor over a tab, button, icon, or some other user interface element, and has further placed the cursor at a specific position within node B (illustrated in planning structure 402 of FIG. 4 as a dark circle) to select node B. The user has further indicated to the graphical top-down planning system that the user wants to apply a planning template to the selected node B, by selecting a button, toolbar icon, toolbar menu item, context menu item, or some other user interface element. This is an example of an "apply template" user interaction. According to the embodiment, in response to the "apply template" user interaction, the graphical top-down planning system can delete an element represented by node B from planning structure 402, and replace the element represented by node B with the elements from planning template 401 within planning structure 402. Further, the graphical top-down planning system can proportionally apply values to the elements from planning template 401 based on a value associated with node B, and the values associated with the elements from planning template 401. FIG. 4 also includes planning structure 403 that is displayed by the graphical top-down planning system. Within planning structure 403, node B is deleted, and is replaced with nodes B1, G, H, I, J, and K. Node B1 has a value of "40", which is equal to the value of deleted node B, node I has a value of "20," node H has a value of "10," node G has a value of "10," node K has a value of "10," and node J has a value of "10." Further, within planning structure 403, a connecting line is displayed: between node A1 and node B1; between node B1 and node I; between node B1 and node H; between node B1 and node G; between node I and node K; and between node I and node J.

FIG. 4 further includes planning structure 404. Planning structure 404 is identical to planning structure 403, except that the user has moved a cursor over a tab, button, icon, or some other user interface element, and has further placed the cursor at a specific position within node D1 (illustrated in planning structure 404 of FIG. 4 as a dark circle). This is another example of an "import from template" user interaction. According to the embodiment, in response to the "import from template" user interaction, the graphical top-down planning system can delete an element represented by node D1 from planning structure 402, and can also delete child elements represented by nodes E and F. The graphical top-down planning system can further replace the elements represented by nodes D1, E, and F with the elements from planning template 401 within planning structure 404. Further, the graphical top-down planning system can proportionally apply values to the elements from planning template 401 based on a value associated with node D1, and the values associated with the elements from planning template 401. FIG. 4 also includes planning structure 405 that is displayed by the graphical top-down planning system. Within planning structure 405, nodes D1, E, and F are deleted, and are replaced with nodes L1, M, N, O, P, and Q. Node L1 has a value of "40", which is equal to the value of deleted node D1, node M has a value of "10," node N has a value of "10," node O has a value of "20," node P has a value of "10," and node Q has a value of "10." Further, within planning structure 405, a connecting line is displayed: between node A1 and node L1; between node L1 and node O; between node L1 and node N; between node L1 and node M; between node O and node Q; and between node O and node P.

Figure 5:
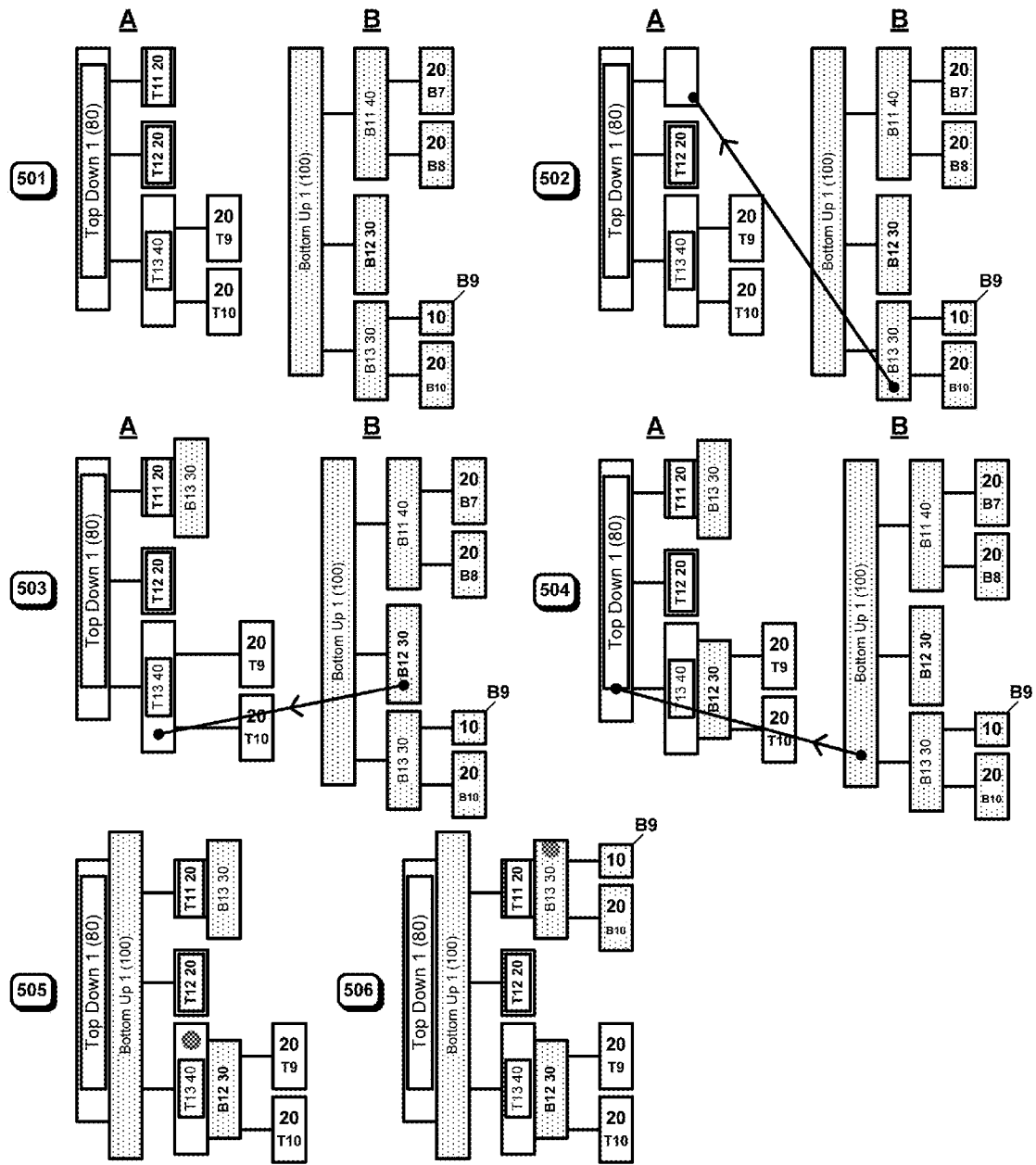
FIG. 5 illustrates linking of a node of a first planning structure that is displayed by a graphical top-down planning system to a node of a second planning structure that is also displayed by the graphical top-down planning system, according to an embodiment of the invention.

FIG. 5 illustrates linking of a node of a first planning structure that is displayed by a graphical top-down planning system to a node of a second planning structure that is also displayed by the graphical top-down planning system, according to an embodiment of the invention. FIG. 5 includes planning structures 501A and 501B, where planning structure 501A is a top-down planning structure, and 501B is a bottom-up planning structure. Of course, in alternate embodiments, rather than linking nodes from a top-down planning structure and a bottom-up planning structure, a graphical top-down planning system can link nodes from two top-down planning structures, or nodes from two bottom-up planning structures.

Planning structure 501A includes a root element represented by node Top Down 1 with an associated value of "80." Planning structure 501A further includes: a first child element that is a child of the root element represented by node T13 with a value of "40"; a second child element that is also a child of the root element represented by node T12 with a value of "20"; and a third child element that is also a child of the root element represented by node T11 with a value of "20". Planning structure 501A further includes: a first grandchild element that is a child of the first child element represented by node T10 with a value of "20"; and a second grandchild element that is a child of the first child element represented by node T9 with a value of "20".

Planning structure 501B includes a root element represented by node Bottom Up 1 with an associated value of "100." Planning structure 501B further includes: a first child element that is a child of the root element represented by node B13 with a value of "30"; a second child element that is also a child of the root element represented by node B12 with a value of "30"; and a third child element that is also a child of the root element represented by node B11 with a value of "40." Planning structure 501B further includes: a first grandchild element that is a child of the first child element represented by node B10 with a value of "20"; a second grandchild element that is a child of the first child element represented by node B9 with a value of "10"; a third grandchild element that is a child of the third child element represented by node B8 with a value of "20"; and a fourth grandchild element that is a child of the third child element represented by node B7 with a value of "20".

FIG. 5 further includes planning structures 502A and 502B. Planning structure 502A and 502B are identical to planning structures 501A and 501B, respectively, except that the user has dragged node B13 of planning structure 502B (illustrated in planning structures 502A and 502B of FIG. 5 as two dark circles, which represent a starting point and ending point of the cursor movement, and a dark line, which represents the cursor movement), where node B13 of planning structure 502B has been dragged onto node T11 of planning structure 502A. This is an example of a "link node" user interaction. According to the embodiment, in response to the "link node" user interaction, the graphical top-down planning system can link node B13 of planning structure 502B with node T11 of planning structure 502A. FIG. 5 further includes planning structures 503A and 503B. Planning structures 503A and 503B are identical to planning structures 502A and 502B, respectively, except that, within planning structure 503A, node B13 of planning structure 503B is displayed adjacent to node T11 of planning structure 503A. This indicates that node T11 is now "linked" to node B13 within planning structure 503A.

Further, in planning structures 503A and 503B of FIG. 5, the user has dragged node B12 of planning structure 502B (illustrated in planning structures 503A and 503B of FIG. 5 as two dark circles, which represent a starting point and ending point of the cursor movement, and a dark line, which represents the cursor movement), where node B12 of planning structure 503B has been dragged onto node T13 of planning structure 503A. This is another example of a "link node" user interaction. According to the embodiment, in response to the "link node" user interaction, the graphical top-down planning system can link node B12 of planning structure 503B with node T13 of planning structure 503A. FIG. 5 further includes planning structures 504A and 504B. Planning structures 504A and 504B are identical to planning structures 503A and 503B, respectively, except that, within planning structure 504A, node B12 of planning structure 503B is displayed adjacent to node T13 of planning structure 503A, indicating that nodes B12 and T13 are now linked within planning structure 504A.

Further, in planning structures 504A and 504B of FIG. 5, the user has dragged node "Bottom Up 1" of planning structure 504B (illustrated in planning structures 504A and 504B of FIG. 5 as two dark circles, which represent a starting point and ending point of the cursor movement, and a dark line, which represents the cursor movement), onto node "Top Down 1" of planning structure 504A. This is another example of a "link node" user interaction. According to the embodiment, in response to the "link node" user interaction, the graphical top-down planning system can link node "Bottom Up 1" of planning structure 504B with node "Top Down 1" of planning structure 504A. FIG. 5 further includes planning structure 505. Planning structure 505 is identical to planning structure 504A, except that, within planning structure 505, node "Bottom Up 1" is displayed adjacent to node "Top Down 1", indicating that these two nodes are now lined within planning structure 505. Linking two nodes from different planning structures can allow a user to visually compare and contrast two planning structures, such as a top-down planning structure and a bottom-up planning structure. Although not illustrated in FIG. 5, a user can drag node "Bottom Up 1," in a direction away from node "Top Down 1" within planning structure 505. This is an example of an "unlink node" user interaction. In response to the "unlink node" user interaction, the graphical top-down planning system can remove the link between node "Bottom Up 1," and node "Top Down 1". Further, as a result of the "unlink node" user interaction, node "Bottom Up 1," will no longer be displayed within planning structure 505.

Further, in planning structure 505, the user has placed the cursor at a specific position within node T13 (illustrated in planning structure 505 of FIG. 5 as a dark circle). This is an example of a "view linked details" user interaction. According to the embodiment, in response to the "view linked details" user interaction, the graphical top-down planning system can display node T13, and its children nodes T10 and T9. Further, while node B12 does not have any children nodes, in embodiments where B12 did have children nodes, these nodes can be hidden from view. Additionally, if the user places the cursor within node B12, rather than node T13, the graphical top-down planning system can display node B12, and can hide children nodes T10 and T9, from view. As previously described, this can allow a user to visually compare and contrast two or more linked planning structures, such as a top-down planning structure and a bottom-up planning structure.

FIG. 5 further includes planning structure 506. Planning structure 506 is identical to planning structure 505, except that the user has placed the cursor at a specific position within node B13 (illustrated in planning structure 506 of FIG. 5 as a dark circle). This is another example of a "view linked details" user interaction. According to the embodiment, in response to the "view linked details" user interaction, the graphical top-down planning system can display node B13, and its children nodes B10 and B9. According to the embodiment, when a node in a "composite linked node set" is selected, the selection is remembered by the graphical top-down planning system until the selection is specifically changed, even when a subsequent selection by the user is in some other part of the planning structure. Thus, in the illustrated embodiment, the graphical top-down planning system can continue to display node B12. Further, while node T11 does not have any children nodes, in embodiments where T11 did have children nodes, these nodes can be hidden from view. Additionally, if the user places the cursor within node T11, rather than node B13, the graphical top-down planning system can display node T11, and can hide node B13 and its children nodes B10 and B9, from view. As previously described, this can allow a user to visually compare and contrast two or more linked planning structures, such as a top-down planning structure and a bottom-up planning structure. For example, three or more nodes from two or more different planning structures can be linked as a "single-linked node set."

In alternate embodiments, a node can be expanded or collapsed through an interaction with a tab, button, icon, or some other user interface element displayed within the user interface of the graphic top-down planning system, such as a plus icon or a minus icon. Further, in some alternate embodiments, copying/pasting of a node can be facilitated by the top-down planning system through various tabs, buttons, icons, or some other user interface elements, such as context menu options or keyboard shortcuts.

Figure 6:
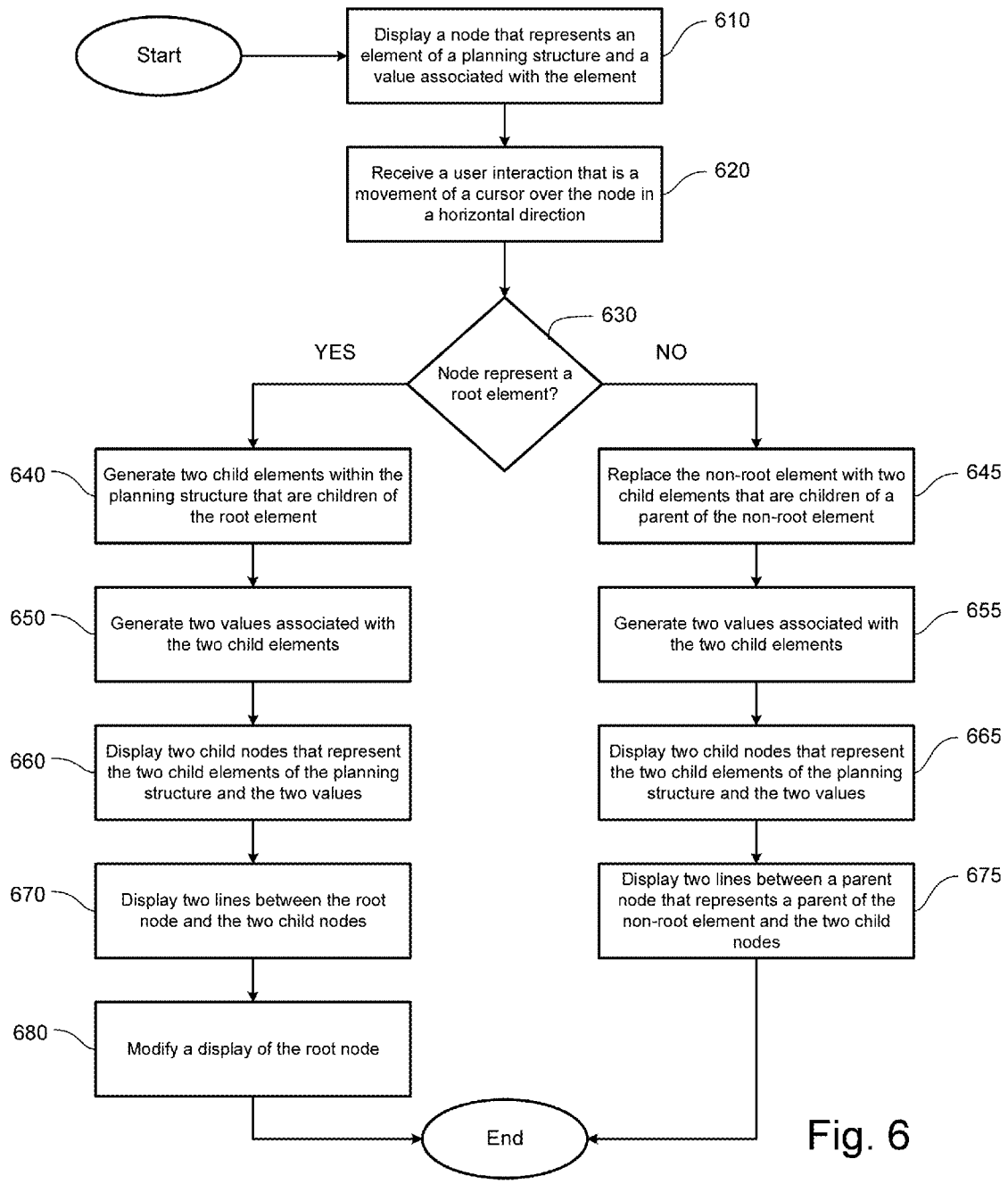
FIG. 6 illustrates a flow diagram of the functionality of a graphical top-down planning module, according to an embodiment of the invention.

FIG. 6 illustrates a flow diagram of the functionality of a graphical top-down planning module (such as graphical top-down planning module 16 of FIG. 1), according to an embodiment of the invention. In one embodiment, the functionality of the flow diagram of FIG. 6, as well as the functionality of the flow diagrams of FIGS. 7-13 below, are each implemented by software stored in a memory or some other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. In certain embodiments, some of the functionality of the flow diagrams of FIGS. 6-13 can be omitted.

The flow begins, and proceeds to 610. At 610, a node that represents an element of a planning structure, and a value associated with the element, are displayed within a user interface. In certain embodiments, a planning structure includes a root element, and optionally includes a hierarchy of one or more descendant elements, where the root element has a hierarchical relationship with each descendant element. Further, in some embodiments, the node can be a vertical bar that includes a solid outline. However, in other embodiments, the node can be a horizontal bar, or some other visual representation. The flow then proceeds to 620.

At 620, a user interaction that is a movement of a cursor over the node in a horizontal direction is received. In certain embodiments, the user interaction can be received by moving the cursor over the node using a cursor control, such as a mouse. In other embodiments, the user interaction can be received by swiping the user interface with a finger, stylus, or some other type of user input equipment. Further, in embodiments where the node is a horizontal bar, the movement of the cursor over the node can be in a vertical direction, rather than a horizontal direction. The flow proceeds to 630.

At 630, it is determined whether the node represents a root element of the planning structure. If the node represents a root element, the flow proceeds to 640. If the node does not represent the root element, the flow proceeds to 645.

At 640, two child elements are generated within the planning structure, where the two child elements are children of the root element. The flow then proceeds to 650.

At 650, two values that are associated with the two child elements are generated, where a combination of the two values is equal to the value associated with the root element. The flow then proceeds to 660.

At 660, two child nodes that represent the two child elements of the planning structure, and the two values associated with the two child elements, are displayed within the user interface. In some embodiments, the two child nodes can be vertical bars, where each vertical bar includes a solid outline. The flow then proceeds to 670.

At 670, two lines between the node that represents the root element of the planning structure and the two child nodes that represent the two child elements of the planning structure are displayed within the user interface. More specifically, a first line between the node that represents the root element and the first child node that represents the first child element is displayed within the user interface. A second line between the node that represents the root element and the second child node that represents the second child element is further displayed within the user interface. The first line and the second line can each represent a parent-child relationship. The flow then proceeds to 680.

At 680, the display of the node that represents the root element is modified. In certain embodiments, the node can be modified to include a dashed outline instead of a solid outline. The flow then ends.

At 645, the non-root element is replaced with two child elements within the planning structure, where the two child elements are children of a parent of the non-root element. The flow then proceeds to 655.

At 655, two values that are associated with the two child elements are generated, where a combination of the two values is equal to the value associated with the root element. The flow then proceeds to 665.

At 665, two child nodes that represent the two child elements of the planning structure, and the two values associated with the two child elements, are displayed within the user interface. In some embodiments, the two child nodes can be vertical bars, where each vertical bar includes a solid outline. Further, the display of the two child nodes can replace a display of a node that represents the replaced non-root element. The flow then proceeds to 675.

At 675, two lines between a node that represents a parent of the non-root element of the planning structure and the two child nodes that represent the two child elements of the planning structure are displayed within the user interface. More specifically, a first line between the node that represents the parent of the non-root element and the first child node that represents the first child element is displayed within the user interface. A second line between the node that represents the parent of the non-root element and the second child node that represents the second child element is further displayed within the user interface. The first line and the second line can each represent a parent-child relationship. Further, the display of the two lines can replace a display of a line between the node that represents the parent of the non-root element and the replaced non-root element. The flow then ends.

Figure 7:
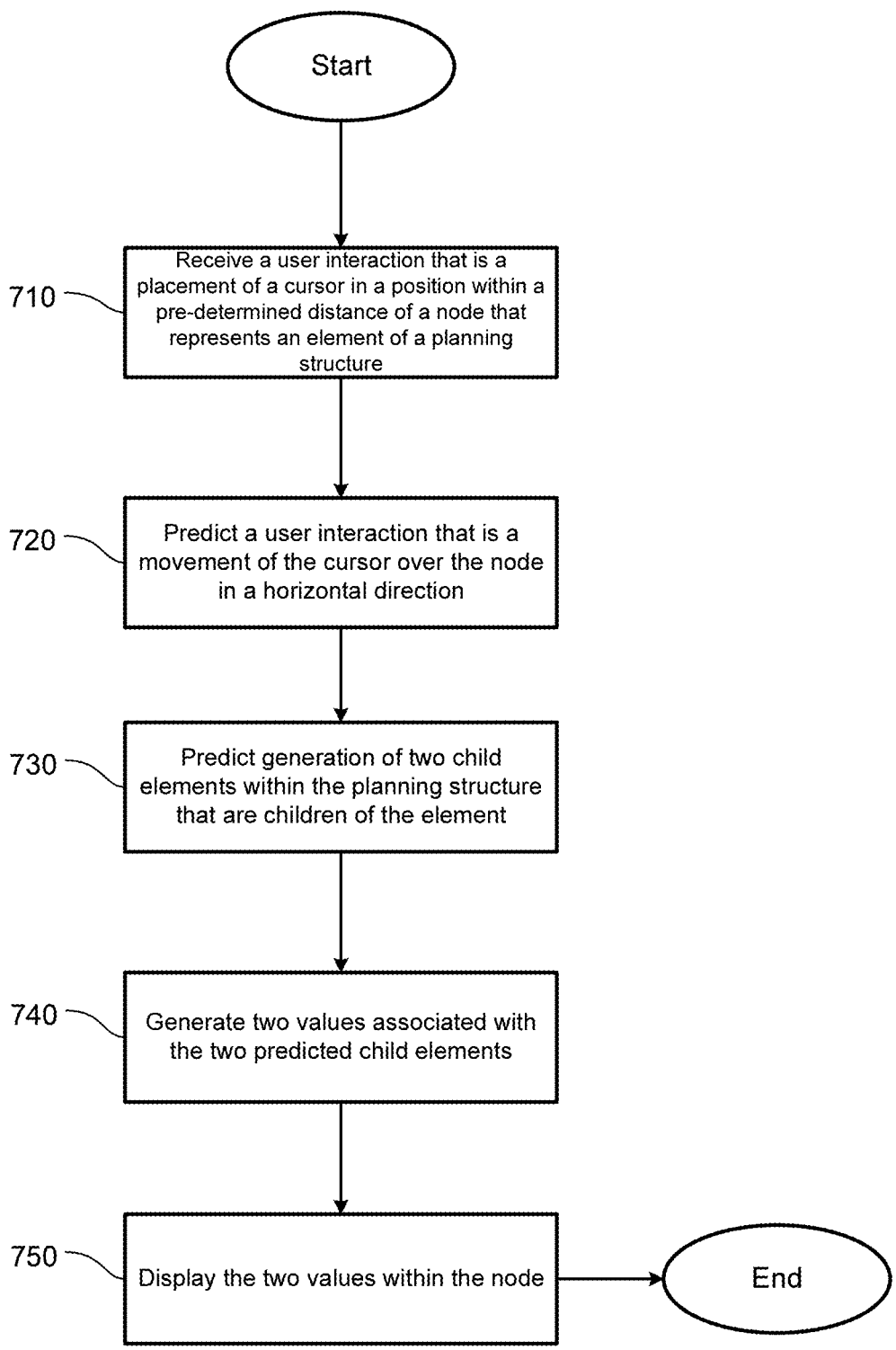
FIG. 7 illustrates a flow diagram of the functionality of a graphical top-down planning module, according to another embodiment of the invention.

FIG. 7 illustrates a flow diagram of the functionality of a graphical top-down planning module (such as graphical top-down planning module 16 of FIG. 1), according to another embodiment of the invention. The flow begins and proceeds to 710. At 710, a user interaction that is a placement of a cursor in a position within a pre-determined distance of a node that represents an element of a planning structure is received. In certain embodiments, the user interaction can be received by placing the cursor at the position using a cursor control, such as a mouse. In other embodiments, the user interaction can be received by "tapping" (or otherwise making contact with) the user interface at the position with a finger, stylus, or some other type of user input equipment. In some embodiments, the node can be a vertical bar. However, in alternate embodiments, the node can be a horizontal bar. The flow then proceeds to 720.

At 720, a user interaction that is a movement of the cursor over the node in a horizontal direction is predicted. In certain embodiments, when the cursor is placed in the position for a pre-determined duration, it can be determined that the next user interaction will be a movement of the cursor over the node in a horizontal direction. In embodiments where the node is a horizontal bar, a user interaction that is a movement of the cursor over the node in a vertical direction, rather than a horizontal direction, can be predicted. The flow then proceeds to 730.

At 730, a generation of two child elements within the planning structure is predicted, where the two child elements are children of the element. The flow then proceeds to 740.

At 740, two values that are associated with the two predicted child elements are generated, where a combination of the two values is equal to a value associated with the element. The flow then proceeds to 750.

At 750, the two values are displayed within the node within the user interface. In certain embodiments, if the cursor is moved away from the position within the pre-determined distance of the node, the display of the two values are deleted within the user interface, and the two child elements, along with the two associated values, are deleted within the planning structure. The flow then ends.

Figure 8:
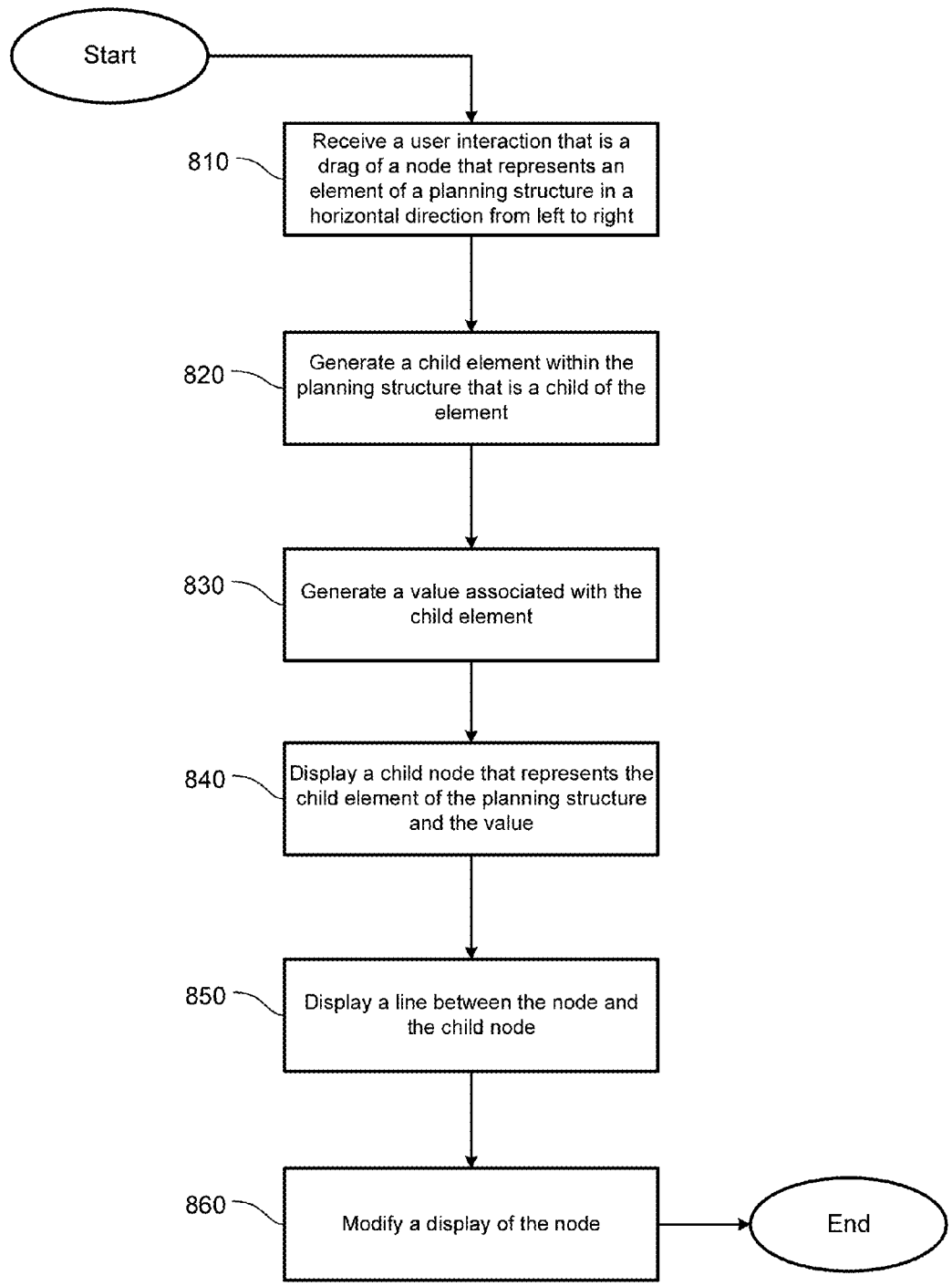
FIG. 8 illustrates a flow diagram of the functionality of a graphical top-down planning module, according to another embodiment of the invention.

FIG. 8 illustrates a flow diagram of the functionality of a graphical top-down planning module (such as graphical top-down planning module 16 of FIG. 1), according to another embodiment of the invention. The flow begins, and proceeds to 810. At 810, a user interaction that is a drag of a node that represents an element of a planning structure in a horizontal direction is received. In certain embodiments, the user interaction can be received by dragging the node using a cursor control, such as a mouse. In other embodiments, the user interaction can be received by swiping the user interface with a finger, stylus, or some other type of user input equipment. In certain embodiments, the horizontal direction can be from left to right. Further, in embodiments where the node is a horizontal bar, the movement of the cursor over the node can be in a vertical direction, rather than a horizontal direction. The flow then proceeds to 820.

At 820, a child element is generated within the planning structure, where the child element is a child of the element. The flow then proceeds to 830.

At 830, a value that is associated with the child element is generated, where the value is equal to the value associated with the element. The flow then proceeds to 840.

At 840, a child node that represents the child element of the planning structure, and the value associated with the child element, are displayed within the user interface. In some embodiments, the child node can be a vertical bar, where the vertical bar includes a solid outline. The flow then proceeds to 850.

At 850, a line between the node that represents the element of the planning structure and the child node that represents the child element of the planning structure is displayed within the user interface. The line can represent a parent-child relationship. The flow then proceeds to 860.

At 860, the display of the node that represents the element is modified. In certain embodiments, the node can be modified to include a dashed outline instead of a solid outline. The flow then ends.

Figure 9:
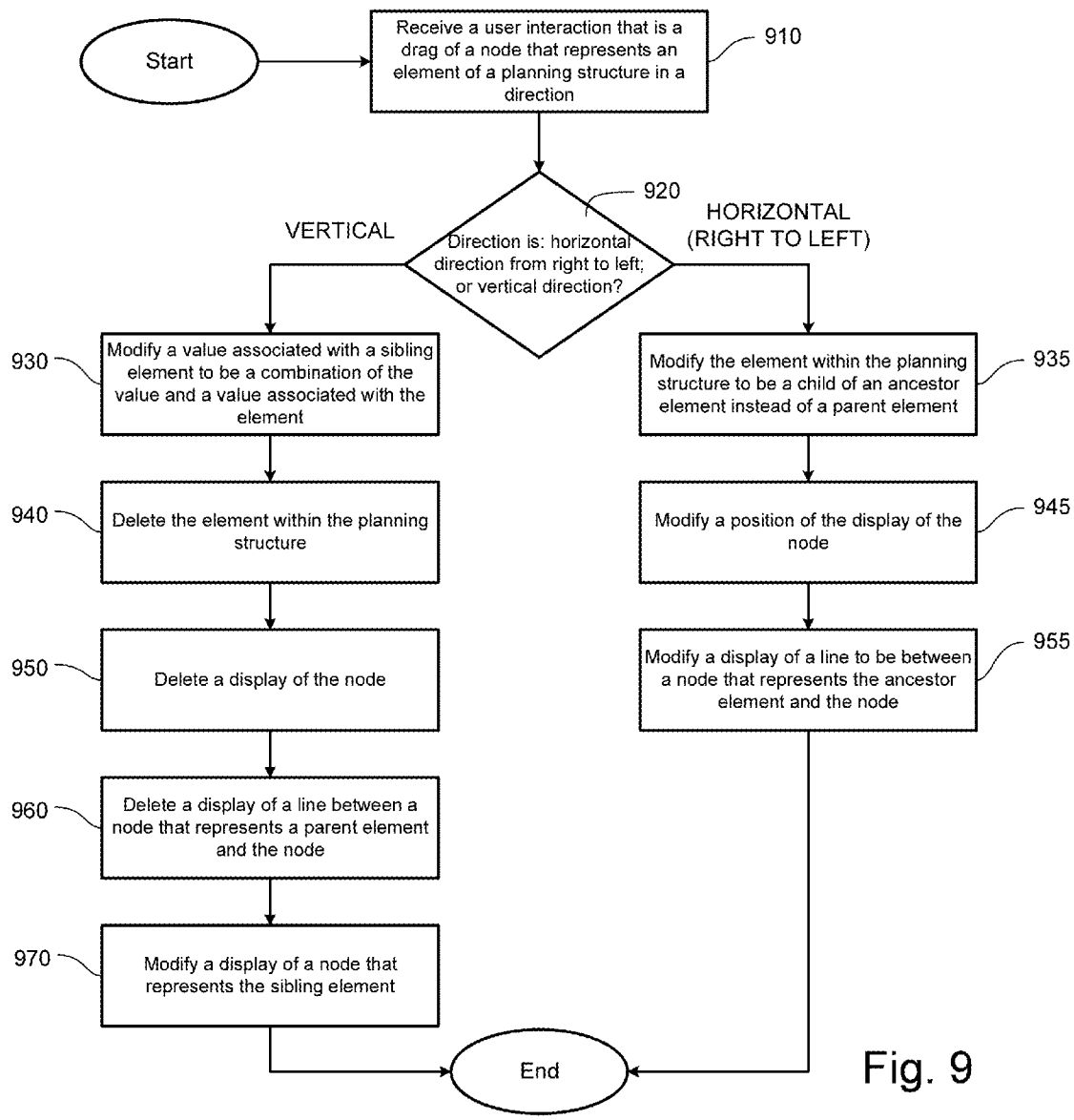
FIG. 9 illustrates a flow diagram of the functionality of a graphical top-down planning module, according to another embodiment of the invention.

FIG. 9 illustrates a flow diagram of the functionality of a graphical top-down planning module (such as graphical top-down planning module 16 of FIG. 1), according to another embodiment of the invention. The flow begins, and proceeds to 910. At 910, a user interaction that is a drag of a node that represents an element of a planning structure in a direction that is either: (a) a horizontal direction from right to left; or (b) a vertical direction, is received. In certain embodiments, the user interaction can be received by dragging the node using a cursor control, such as a mouse. In other embodiments, the user interaction can be received by swiping the user interface with a finger, stylus, or some other type of user input equipment. Further, in certain embodiments, the node is dragged onto another node that represents another element of the planning structure. In embodiments where the node is a horizontal bar, the movement of the cursor over the node can be either: (a) a vertical direction from bottom to top; or (b) a horizontal direction. The flow proceeds to 920.

At 920, it is determined whether the direction is either: (a) a horizontal direction from right to left; or (b) a vertical direction. If the direction is a vertical direction, the flow proceeds to 930. If the direction is a horizontal direction from right to left, the flow proceeds to 935. If the direction is neither a horizontal direction from right to left, nor a vertical direction, the flow ends (not illustrated in FIG. 9).

At 930, a value associated with a sibling element (i.e., an element that is a sibling of the element represented by the node) is modified to be a combination of the value associated with the sibling element and a value associated with the element. In certain embodiments, the sibling element can be the other element represented by the other node that the node is dragged onto. The flow then proceeds to 940.

At 940, the element is deleted within the planning structure. The flow then proceeds to 950.

At 950, a display of the node is deleted within the user interface. The flow then proceeds to 960.

At 960, a display of a line between a node that represents a parent element (i.e., an element that is a parent of the element represented by the node) and the node is deleted. The flow then proceeds to 970.

At 970, a display of a node that represents the sibling element is modified. In certain embodiments, a size of the node that represents the sibling element is increased in correlation to the modified value associated with the sibling element. The flow the ends.

At 935, the element is modified within the planning structure to be a child of an ancestor element (i.e., an element that is an ancestor of the element represented by the node) instead of a parent element (i.e., an element that is a parent of the element represented by the node). In certain embodiments, the ancestor element can be the other element represented by the other node that the node is dragged onto. The flow then proceeds to 935.

At 945, a position of a display of the node is modified. In certain embodiments, the position can be modified so that the node is displayed in a position that is one hierarchical level to the right of a node that represents the ancestor element (i.e., the other node that the node is dragged onto). The flow then proceeds to 955.

At 955, a display of a line is modified to be between the node that represents the ancestor element (i.e., the other node that the node is dragged onto) and the node. In certain embodiments, a value associated with one or more elements that are children of the ancestor element can be decreased by a factor of a value associated with the element. Further, in these embodiments, a size of one or more nodes that represent the one or more elements that are children of the ancestor element can be decreased in correlation to the decreased values associated with the one or more elements that are children of the ancestor element. The flow then ends.

Figure 10:
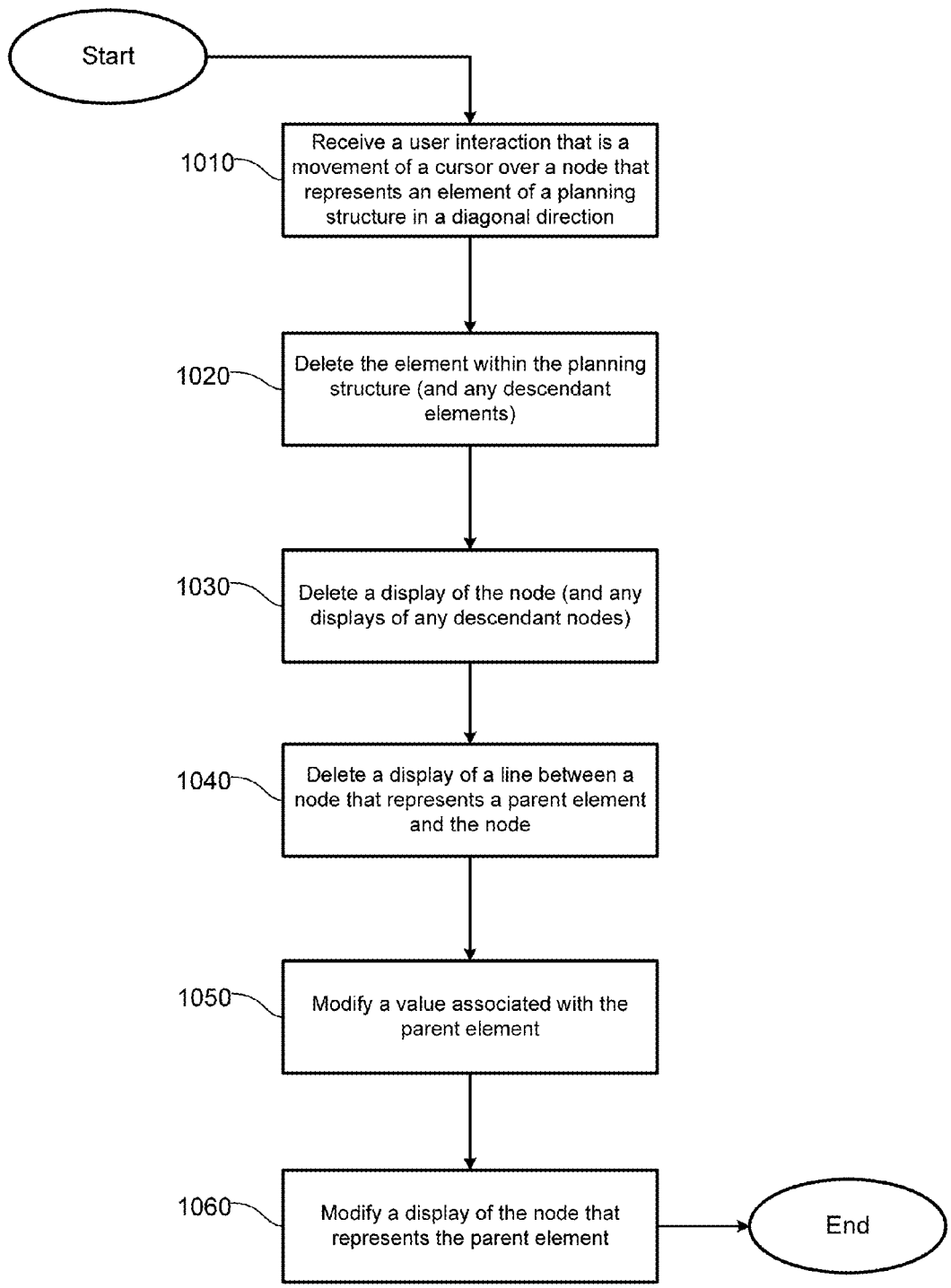
FIG. 10 illustrates a flow diagram of the functionality of a graphical top-down planning module, according to another embodiment of the invention.

FIG. 10 illustrates a flow diagram of the functionality of a graphical top-down planning module (such as graphical top-down planning module 16 of FIG. 1), according to another embodiment of the invention. The flow begins and proceeds to 1010. At 1010, a user interaction that is a movement of a cursor over a node that represents an element of a planning structure in a diagonal direction is received. In certain embodiments, the user interaction can be received by moving the cursor over the node using a cursor control, such as a mouse. In other embodiments, the user interaction can be received by swiping the user interface with a finger, stylus, or some other type of user input equipment. In some embodiments, the diagonal direction can be left bottom to right top. In other embodiments, the diagonal direction can be right top to left bottom. In other embodiments, the diagonal direction can be left top to right bottom. In other embodiments, the diagonal direction can be right bottom to left top. The flow then proceeds to 1020.

At 1020, the element is deleted within the planning structure. In certain embodiments where the element has descendant elements, the descendant elements can also be deleted within the planning structure. The flow then proceeds to 1030.

At 1030, a display of the node is deleted within the user interface. In certain embodiments, where the element has descendant elements, displays of nodes that represent the descendant elements can also be deleted within the user interface. The flow then proceeds to 1040.

At 1040, a display of a line between a node that represents a parent element (i.e., an element that is a parent of the element represented by the node) and the node is deleted. The flow then proceeds to 1050.

At 1050, a value associated with the parent element is modified. In certain embodiments, the value can be decreased by a value associated with the element. The flow then proceeds to 1060.

At 1060, a display of the node that represents the parent element is modified. In certain embodiments, a size of the node that represents the parent element is decreased in correlation to the modified value associated with the parent element. The flow the ends.

Figure 11:
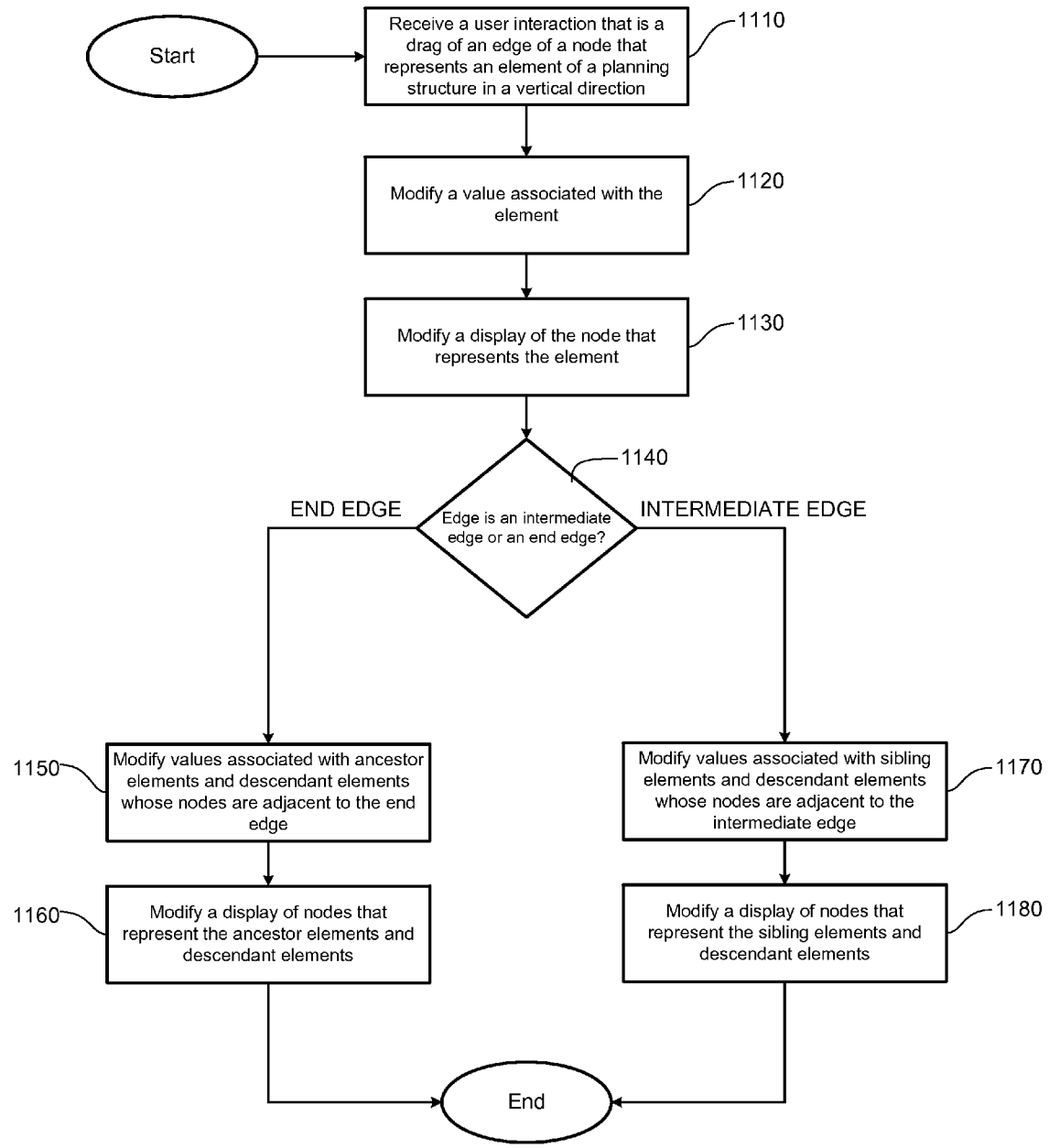
FIG. 11 illustrates a flow diagram of the functionality of a graphical top-down planning module, according to another embodiment of the invention.

FIG. 11 illustrates a flow diagram of the functionality of a graphical top-down planning module (such as graphical top-down planning module 16 of FIG. 1), according to another embodiment of the invention. The flow begins, and proceeds to 1110. At 1110, a user interaction that is a drag of an edge of a node that represents an element of a planning structure in a vertical direction is received. In certain embodiments, the edge of a node can be an "end edge," which is an edge along a top or a bottom of the planning structure. In other embodiments, the edge of a node can be an "intermediate edge," which is an edge that is not along the top or the bottom of the planning structure. In certain embodiments, the user interaction can be received by dragging the node using a cursor control, such as a mouse. In other embodiments, the user interaction can be received by swiping the user interface with a finger, stylus, or some other type of user input equipment. In embodiments where the node is a horizontal bar, a user interaction that is a drag of an edge of a node that represents an element of a planning structure in a horizontal direction, rather than a vertical direction, can be received. The flow then proceeds to 1120.

At 1120, a value associated with the element is modified by a modification value. In certain embodiments, the value can be increased by an increase value. In other embodiments, the value can be decreased by a decrease value. The flow then proceeds to 1130.

At 1130, a display of the node that represents the element is modified. In certain embodiments, a size of the node that represents the element is increased in correlation to the modified value associated with the element. In other embodiments, a size of the node that represents the element is decreased in correlation to the modified value associated with the element. The flow then proceeds to 1140.

At 1140, it is determined whether the edge of the node that is dragged is an end edge or an intermediate edge. If the edge of the node is an end edge, the flow proceeds to 1150. If the edge of the node is an intermediate edge, the flow proceeds to 1170.

At 1150, values associated with ancestor elements and descendant elements whose nodes are adjacent to the end edge are also modified by the modification value. In certain embodiments, the values can be increased by the increase value. In other embodiments, the values can be decreased by the decrease value. The flow then proceeds to 1160.

At 1160, displays of nodes that represent the ancestor elements and descendant elements are modified. In certain embodiments, sizes of the nodes that represent the ancestor elements and descendant elements are increased in correlation to the modified value associated with the ancestor elements and descendant elements. In other embodiments, sizes of the nodes that represent the ancestor elements and descendant elements are decreased in correlation to the modified value associated with the ancestor elements and descendant elements. The flow then ends.

At 1170, values associated with sibling elements and descendant elements whose nodes are adjacent to the intermediate edge are modified by either the modification value or an inverse of the modification value. In certain embodiments, the values can either be increased by the increase value or decreased by an inverse of the increase value. In other embodiments, the values can either be decreased by the decrease value or increased by an inverse of the decrease value. The flow then proceeds to 1180.

At 1180, displays of nodes that represent the sibling elements and descendant elements are modified. In certain embodiments, sizes of the nodes that represent the sibling elements and descendant elements are increased in correlation to the modified value associated with the sibling elements and descendant elements. In other embodiments, sizes of the nodes that represent the sibling elements and descendant elements are decreased in correlation to the modified value associated with the sibling elements and descendant elements. The flow then ends.

Figure 12:
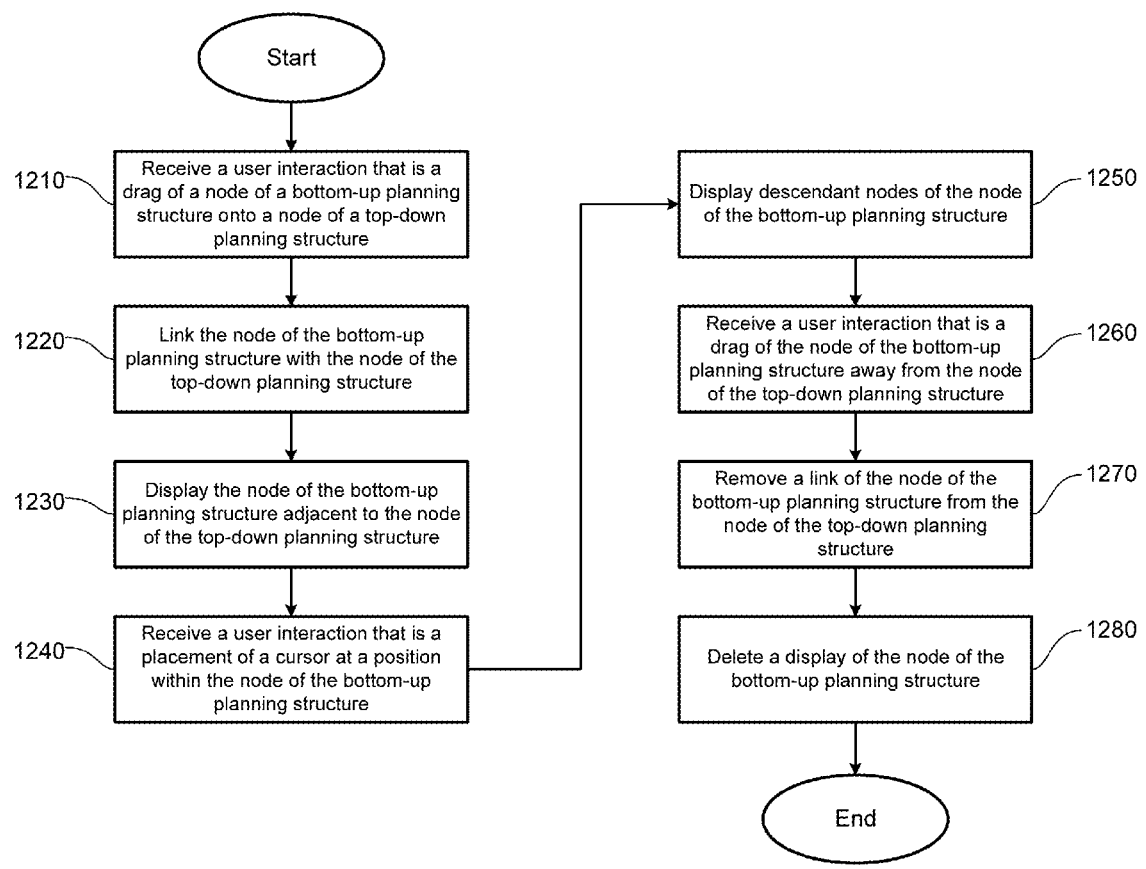
FIG. 12 illustrates a flow diagram of the functionality of a graphical top-down planning module, according to another embodiment of the invention.

FIG. 12 illustrates a flow diagram of the functionality of a graphical top-down planning module (such as graphical top-down planning module 16 of FIG. 1), according to another embodiment of the invention. The flow begins and proceeds to 1210. At 1210, a user interaction that is a drag of a node of a bottom-up planning structure onto a node of a top-down planning structure is received. In certain embodiments, the user interaction can be received by dragging the node of the bottom-up planning structure using a cursor control, such as a mouse. In other embodiments, the user interaction can be received by swiping the user interface with a finger, stylus, or some other type of user input equipment. In certain embodiments, the bottom-up planning structure can be replaced by another top-down planning structure. The flow then proceeds to 1220.

At 1220, the node of the bottom-up planning structure is linked with the node of the top-down planning structure. In certain embodiments, the node of the bottom-up planning structure is linked with the node of the top-down planning structure by creating an association between the node of the bottom-up planning structure and the node of the top-down planning structure, and storing the association. The flow then proceeds to 1230.

At 1230, the node of the bottom-up planning structure is displayed adjacent to the node of the top-down planning structure within a user interface. In certain embodiments, when the node of the top-down planning structure is displayed, the association between the node of the bottom-up planning structure and the node of the top-down planning structure is accessed, and the node of the bottom-up planning structure is displayed as well. The flow then proceeds to 1240.

At 1240, a user interaction that is a placement of cursor at a position within the node of the bottom-up planning structure is received. In certain embodiments, the user interaction can be received by placing the cursor at the position within the node of the bottom-up planning structure using a cursor control, such as a mouse. In other embodiments, the user interaction can be received by swiping the user interface with a finger, stylus, or some other type of user input equipment. The flow then proceeds to 1250.

At 1250, any descendant nodes of the node of the bottom-up planning structure are displayed within the user interface. The flow then proceeds to 1260.

At 1260, a user interaction that is a drag of the node of the bottom-up planning structure away from the node of the top-down planning structure is received. In certain embodiments, the user interaction can be received by dragging the node of the bottom-up planning structure using a cursor control, such as a mouse. In other embodiments, the user interaction can be received by swiping the user interface with a finger, stylus, or some other type of user input equipment. The flow then proceeds to 1270.

At 1270, a link of the node of the bottom-up planning structure is removed from the node of the top-down planning structure. In certain embodiments, the link is removed by deleting the association between the node of the bottom-up planning structure and the node of the top-down planning structure. The flow then proceeds to 1280.

At 1280, a display of the node of the bottom-up planning structure is deleted within the user interface. In certain embodiments, the deletion of the association causes the display of the node of the bottom-up planning structure is deleted. The flow then ends.

Figure 13:
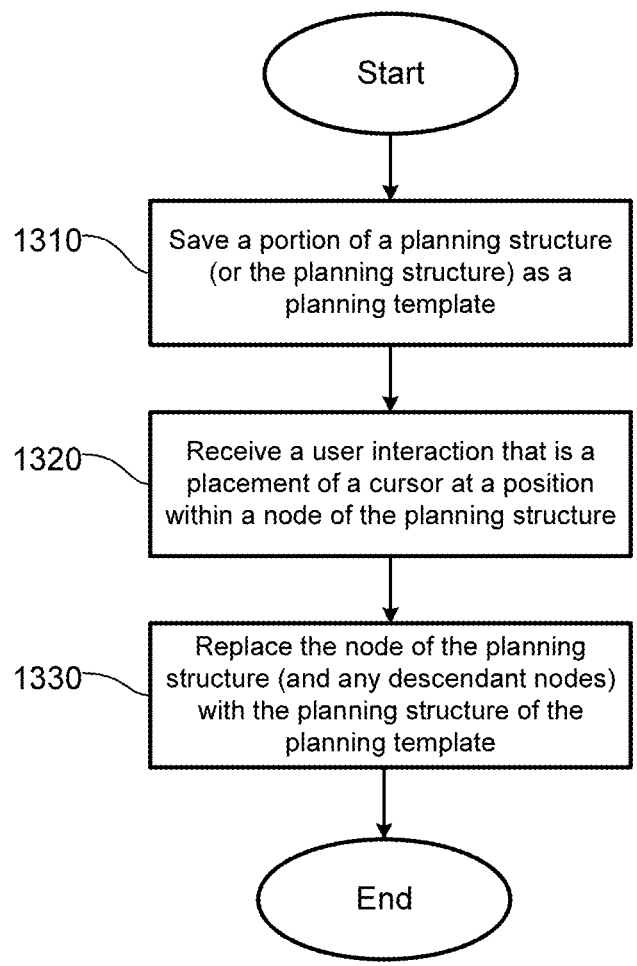
FIG. 13 illustrates a flow diagram of the functionality of a graphical top-down planning module, according to another embodiment of the invention.

FIG. 13 illustrates a flow diagram of the functionality of a graphical top-down planning module (such as graphical top-down planning module 16 of FIG. 1), according to another embodiment of the invention. The flow begins and proceeds to 1310. At 1310, a portion of a planning structure (or the entire planning structure) is saved as a planning template that includes a planning template planning structure. The flow then proceeds to 1320.

At 1320, a user interaction that is a placement of cursor at a position within the node of the bottom-up planning structure is received. In certain embodiments, the user interaction can be received by placing the cursor at the position within a node of a planning structure using a cursor control, such as a mouse. In other embodiments, the user interaction can be received by swiping the user interface with a finger, stylus, or some other type of user input equipment. The flow then proceeds to 1330.

At 1330, the node of the planning structure (and any descendant nodes that are descendants of the node of the planning structure) are replaced with the planning template planning structure of the planning template. The flow then ends.

Thus, a graphic top-down planning system is provided that can visually perform top-down planning for any parameter, and that can manage a planning structure visually. The graphic top-down planning system can give visual cues about comparative proportions of the parameter, and thus, can provide very easy and intuitive top-down planning. Further, the graphic top-down system can provide the ability to compare two planning structures of separate parameters for a single project. The graphic top-down system can also provide the ability to compare top-down and bottom-up planning structures, and make adjustments to both planning structures from a single user interface.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to visually represent a planning structure, the representing comprising:
    displaying a first node that represents a first element of the planning structure and a first value associated with the first element within a user interface, wherein the first node comprises a first outline;
    receiving a first user interaction that comprises a movement of a cursor over the first node in a first direction;
    generating a second element and a third element within the planning structure in response to the first user interaction, wherein the second element and the third element are children of the first element;
    generating a second value associated with the second element and a third value associated with the third element, wherein a combination of the second value and the third value is equal to the first value;

displaying a second node that represents the second element of the planning structure and the second value, and a third node that represents the third element of the planning structure and the third value within the user interface, wherein the second node and the third node each comprise the first outline;

displaying a first line between the first node and the second node and a second line between the first node and the third node within the user interface, wherein the first line and the second line each represent a parent-child relationship;

receiving a third user interaction that comprises a placement of the cursor in a position within a pre-determined distance from the first node;

displaying the second value and the third value within the first node within the user interface; and modifying a display of the first node to comprise a second outline instead of the first outline, wherein the first, second and third values represent a metric associated with a corresponding associated element.

2. The non-transitory computer-readable medium of claim 1, the representing further comprising:

receiving a second user interaction that comprises a movement of the cursor over the second node in the first direction;

replacing the second element with a fourth element and a fifth element within the planning structure in response to the second user interaction, wherein the fourth element and fifth element are children of the first element;

generating a fourth value associated with the fourth element and a fifth value associated with the fifth element, wherein a combination of the fourth value and the fifth value is equal to the second value;

displaying a fourth node that represents the fourth element of the planning structure and the fourth value, and a fifth node that represents the fifth element of the planning structure and the fifth value within the user interface, wherein the fourth node and the fifth node each comprise the first outline, and wherein a display of the fourth node and the fifth node replace a display of the second node; and displaying a third line between the first node and the fourth node and a fourth line between the first node and the fifth node within the user interface, wherein the third line and the fourth line each represent a parent-child relationship, and wherein a display of the third line and the fourth line replace a display of the first line, wherein the fourth and fifth values represent the metric associated with the corresponding associated element.

3. The non-transitory computer-readable medium of claim 1, the representing further comprising:

predicting the first user interaction in response to the third user interaction.

4. The non-transitory computer-readable medium of claim 1, the representing further comprising:

receiving a fourth user interaction that comprises a drag of the second node in a second direction;

generating a sixth element within the planning structure in response to the fourth user interaction, wherein the sixth element is a child of the second element;

generating a sixth value associated with the sixth element, wherein the sixth value is equal to the second value;

displaying a sixth node that represents the sixth element of the planning structure and the sixth value within the user interface, wherein the sixth node comprises the first outline;

displaying a fifth line between the second node and the sixth node within the user interface, wherein the fifth line represents a parent-child relationship; and modifying a display of the second node to comprise a second outline instead of the first outline, wherein the sixth value represents the metric associated with the corresponding associated element.

5. The non-transitory computer-readable medium of claim 4, the representing further comprising:

receiving a fifth user interaction that comprises a drag of the sixth node in a third direction;

modifying the sixth element within the planning structure to be a child of the first element instead of the second element in response to the fifth user interaction;

modifying a position of a display of the sixth node within the user interface; and modifying a display of the fifth line to be between the first node and the sixth node instead of between the second node and the sixth node.

6. The non-transitory computer-readable medium of claim 1, the representing further comprising:

receiving a sixth user interaction that comprises a drag of the third node in a fourth direction;

modifying the second value associated with the second element to equal a combination of the second value and the third value associated with a third element structure in response to the sixth user interaction;

deleting the third element within the planning structure;

deleting a display of the third node within the user interface;

deleting a display of the second line within the user interface; and modifying a display of the second node within the user interface.

7. The non-transitory computer-readable medium of claim 1, the representing further comprising:

receiving a seventh user interaction that comprises a movement of the cursor over the third node in a fifth direction;

deleting the third element within the planning structure;

deleting a display of the third node within the user interface;

deleting a display of the second line within the user interface;

decreasing the first value associated with the first element by the third value associated with the third element; and modifying a display of the first node within the user interface.

8. The non-transitory computer-readable medium of claim 1, the representing further comprising:

receiving an eighth user interaction that comprises a drag of an edge of the third node in a sixth direction;

modifying the third value associated with the third element by a modification value in response to the eighth user interaction;

modifying a display of the third node within the user interface;

modifying the second value associated with the second element by the modification value; and modifying a display of the second node within the user interface.

9. The non-transitory computer-readable medium of claim 1, the representing further comprising:

receiving a ninth user interaction that comprises a drag of a node of another planning structure onto the third node of the planning structure;

linking the node of the other planning structure with the third node of the planning structure; and displaying the node of the other planning structure adjacent to the third node of the planning structure within the user interface.

10. The non-transitory computer-readable medium of claim 9, the representing further comprising:

receiving a tenth user interaction that comprises a drag of the node of the other planning structure away from the third node of the planning structure;

removing a link of the node of the other planning structure from the third node of the planning structure; and deleting a display of the node of the other planning structure within the user interface.

11. The non-transitory computer-readable medium of claim 9, the representing further comprising:

receiving an eleventh user interaction that comprises a placement of the cursor in a position within the node of the other planning structure; and displaying one or more descendant nodes of the node of the other planning structure within the user interface.

12. The non-transitory computer-readable medium of claim 1, the representing further comprising saving at least a portion of the planning structure as a planning template comprising a planning template planning structure.

13. The non-transitory computer-readable medium of claim 1, the representing further comprising:

receiving a twelfth user interaction that comprises a placement of the cursor in a position within the third node of the planning structure; and replacing the third node of the planning structure with a planning template planning structure of a planning template.

14. The non-transitory computer-readable medium of claim 1, wherein the first node comprises a vertical bar;

wherein the first direction comprises a horizontal direction;

wherein the first outline comprises a solid outline; and wherein the second outline comprises a dashed outline.

15. A computer-implemented method for visually representing a planning structure, the computer-implemented method comprising:

displaying a first node that represents a first element of the planning structure and a first value associated with the first element within a user interface, wherein the first node comprises a first outline;

receiving a first user interaction that comprises a movement of a cursor over the first node in a first direction;

generating a second element and a third element within the planning structure in response to the first user interaction, wherein the second element and the third element are children of the first element;

generating a second value associated with the second element and a third value associated with the third element, wherein a combination of the second value and the third value is equal to the first value;

displaying a second node that represents the second element of the planning structure and the second value, and a third node that represents the third element of the planning structure and the third value within the user interface, wherein the second node and the third node each comprise the first outline;

displaying a first line between the first node and the second node and a second line between the first node and the third node within the user interface, wherein the first line and the second line each represent a parent-child relationship;

receiving a third user interaction that comprises a placement of the cursor in a position within a pre-determined distance from the first node;

displaying the second value and the third value within the first node within the user interface; and modifying a display of the first node to comprise a second outline instead of the first outline, wherein the first, second and third values represent a metric associated with a corresponding associated element.

16. The computer-implemented method of claim 15, further comprising:

receiving a second user interaction that comprises a movement of the cursor over the second node in the first direction;

replacing the second element with a fourth element and a fifth element within the planning structure in response to the second user interaction, wherein the fourth element and fifth element are children of the first element;

generating a fourth value associated with the fourth element and a fifth value associated with the fifth element, wherein a combination of the fourth value and the fifth value is equal to the second value;

displaying a fourth node that represents the fourth element of the planning structure and the fourth value, and a fifth node that represents the fifth element of the planning structure and the fifth value within the user interface, wherein the fourth node and the fifth node each comprise the first outline, and wherein a display of the fourth node and the fifth node replace a display of the second node; and displaying a third line between the first node and the fourth node and a fourth line between the first node and the fifth node within the user interface, wherein the third line and the fourth line each represent a parent-child relationship, and wherein a display of the third line and the fourth line replace a display of the first line, wherein the fourth and fifth values represent the metric associated with the corresponding associated element.

17. The computer-implemented method of claim 15, further comprising:

predicting the first user interaction in response to the third user interaction.

18. The computer-implemented method of claim 15, further comprising:

receiving a fourth user interaction that comprises a drag of a node of another planning structure onto the third node of the planning structure;

linking the node of the other planning structure with the third node of the planning structure; and displaying the node of the other planning structure adjacent to the third node of the planning structure within the user interface.

19. The computer-implemented method of claim 15, further comprising saving at least a portion of the planning structure as a planning template comprising a planning template planning structure.

20. A system for visually representing a planning structure, the system comprising:

a hardware processor configured to:

display a first node that represents a first element of the planning structure and a first value associated with the first element within a user interface, wherein the first node comprises a first outline;

receive a first user interaction that comprises a movement of a cursor over the first node in a first direction;

generate a second element and a third element within the planning structure in response to the first user interaction, wherein the second element and the third element are children of the first element;

generate a second value associated with the second element and a third value associated with the third element, wherein a combination of the second value and the third value is equal to the first value;

display a second node that represents the second element of the planning structure and the second value, and a third node that represents the third element of the planning structure and the third value within the user interface, wherein the second node and the third node each comprise the first outline;

display a first line between the first node and the second node and a second line between the first node and the third node within the user interface, wherein the first line and the second line each represent a parent-child relationship;

receive a third user interaction that comprises a placement of the cursor in a position within a pre-determined distance from the first node;

display the second value and the third value within the first node within the user interface; and modify the display of the first node to comprise a second outline instead of the first outline, wherein the first, second and third values represent a metric associated with a corresponding associated element.

21. The system of claim 20, the hardware processor further configured to:

receive a second user interaction that comprises a movement of the cursor over the second node in the first direction;

replace the second element with a fourth element and a fifth element within the planning structure in response to the second user interaction, wherein the fourth element and fifth element are children of the first element;

generate a fourth value associated with the fourth element and a fifth value associated with the fifth element, wherein a combination of the fourth value and the fifth value is equal to the second value;

display a fourth node that represents the fourth element of the planning structure and the fourth value, and a fifth node that represents the fifth element of the planning structure and the fifth value within the user interface, wherein the fourth node and the fifth node each comprise the first outline, and wherein a display of the fourth node and the fifth node replace a display of the second node; and display a third line between the first node and the fourth node and a fourth line between the first node and the fifth node within the user interface, wherein the third line and the fourth line each represent a parent-child relationship, and wherein a display of the third line and the fourth line replace a display of the first line, wherein the fourth and fifth values represent the metric associated with the corresponding associated element.

22. The system of claim 20, the hardware processor further configured to:

predict the first user interaction in response to the third user interaction.

23. The system of claim 20, the hardware processor further configured to:

receive a fourth user interaction that comprises a drag of a node of another planning structure onto the third node of the planning structure;

link the node of the other planning structure with the third node of the planning structure; and display the node of the other planning structure adjacent to the third node of the planning structure within the user interface.

24. The system of claim 20, the hardware processor further configured to save at least a portion of the planning structure as a planning template comprising a planning template planning structure.

* * * * *

UNITED STATES PATENT AND TRADEMARK OFFICE
CERTIFICATE OF CORRECTION

| | | |
|---|---|---|
| PATENT NO. | : 9,710,571 B2 | Page 1 of 3 |
| APPLICATION NO. | : 14/200054 | |
| DATED | : July 18, 2017 | |
| INVENTOR(S) | : De et al. | |

It is certified that error appears in the above-identified patent and that said Letters Patent is hereby corrected as shown below:

On the Title Page

On page 2, Column 2, under Other Publications, Line 17, delete "planing" and insert -- planning --, therefor.

In the Drawings

On sheet 2 of 13, in Fig. 2, under Reference Numeral 202, Line 1, delete " 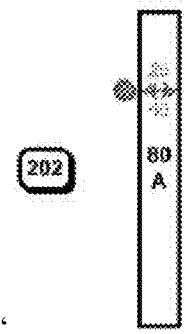 " and insert -- 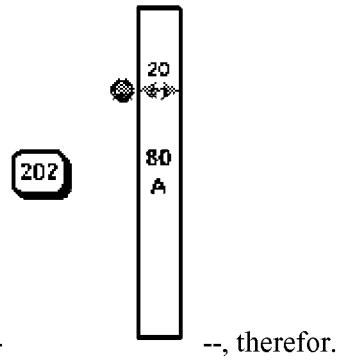 --, therefor.

Signed and Sealed this
Twenty-seventh Day of February, 2018

Andrei Iancu
*Director of the United States Patent and Trademark Office*

CERTIFICATE OF CORRECTION (continued)
U.S. Pat. No. 9,710,571 B2

On sheet 2 of 13, in Fig. 2, under Reference Numeral 205, Line 1, delete " 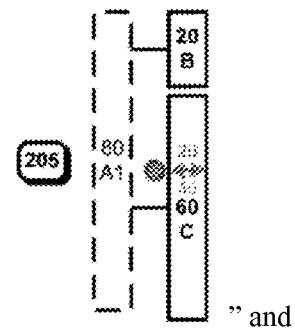 " and insert -- 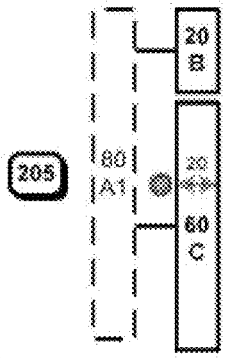 --, therefor.

On sheet 2 of 13, in Fig. 2, under Reference Numeral 208, Line 1, delete " 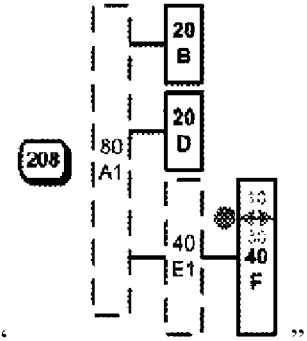 " and insert -- 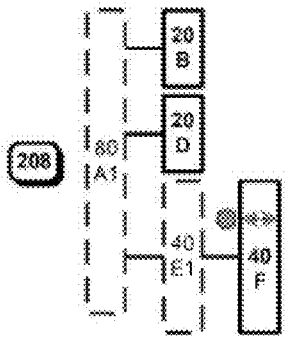 --, therefor.

CERTIFICATE OF CORRECTION (continued)
U.S. Pat. No. 9,710,571 B2

On sheet 2 of 13, in Fig. 2, under Reference Numeral 211, Line 1, delete " 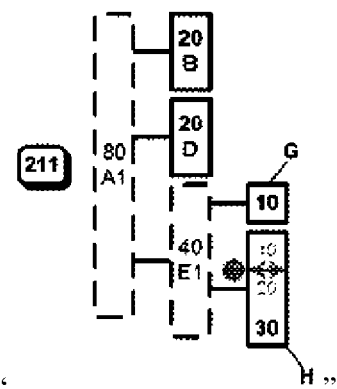

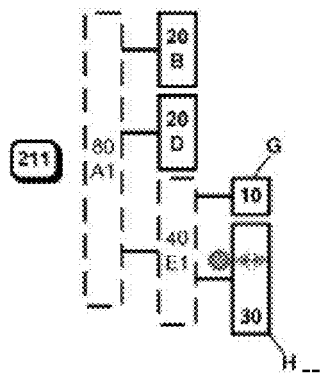

and insert -- H --, therefor.

In the Specification

In Column 3, Line 7, delete "mange" and insert -- manage --, therefor.